(12) United States Patent
Krenz

(10) Patent No.: US 11,289,883 B1
(45) Date of Patent: Mar. 29, 2022

(54) MODULAR PLUG-AND-PLAY POWER DISTRIBUTION SYSTEM FOR A VEHICLE

(71) Applicant: LITT INDUSTRIES, INC., Mesa, AZ (US)

(72) Inventor: Taylor J. Krenz, Mesa, AZ (US)

(*) Notice: Subject to any disclaimer, the term of this patent is extended or adjusted under 35 U.S.C. 154(b) by 0 days.

(21) Appl. No.: 17/471,842

(22) Filed: Sep. 10, 2021

(51) Int. Cl.
| | |
|---|---|
| H02B 1/056 | (2006.01) |
| B60R 16/02 | (2006.01) |
| H01R 25/00 | (2006.01) |
| H01R 27/02 | (2006.01) |
| H02G 1/06 | (2006.01) |
| H04B 1/06 | (2006.01) |
| H01R 13/443 | (2006.01) |

(52) U.S. Cl.
CPC ....... *H02B 1/0565* (2013.01); *B60R 16/0207* (2013.01); *H01R 13/443* (2013.01); *H01R 25/006* (2013.01); *H01R 27/02* (2013.01); *H02G 1/06* (2013.01); *H04B 1/06* (2013.01); *H01R 2201/26* (2013.01)

(58) Field of Classification Search
CPC .............. H02B 1/0565; B60R 16/0207; H01R 13/443; H01R 25/006; H01R 27/02; H01R 2201/26; H02G 1/06; H04B 1/06
USPC ........................................................ 361/622
See application file for complete search history.

(56) References Cited

U.S. PATENT DOCUMENTS

| | | | | |
|---|---|---|---|---|
| 4,122,357 | A * | 10/1978 | Sumida | ............... B60R 16/0207 174/72 A |
| 5,562,502 | A | 10/1996 | Kourimsky | |
| 5,623,169 | A * | 4/1997 | Sugimoto | ........... B60R 16/0207 307/10.1 |
| 6,162,097 | A | 12/2000 | Liang | |
| 6,547,572 | B1 * | 4/2003 | Burdick | .............. B60R 16/0238 439/76.2 |
| 6,600,236 | B2 | 7/2003 | Rhodes | |
| 6,674,182 | B2 | 1/2004 | Maynard et al. | |
| 6,753,754 | B1 | 6/2004 | Black et al. | |
| 7,033,209 | B2 | 4/2006 | Swiatek et al. | |
| 7,132,761 | B2 * | 11/2006 | Rhodes | ............... B60R 16/0207 307/10.1 |
| 7,342,325 | B2 * | 3/2008 | Rhodes | ............... B60R 16/0207 307/10.1 |
| 7,457,106 | B2 * | 11/2008 | Ewing | .................. H01R 25/006 340/635 |
| 7,990,689 | B2 * | 8/2011 | Ewing | .................. H01R 25/006 361/622 |

(Continued)

*Primary Examiner* — Anatoly Vortman
(74) *Attorney, Agent, or Firm* — Parsons & Goltry, PLLC; Michael W. Goltry; Robert A. Parsons

(57) ABSTRACT

A modular power distribution system for use on a vehicle having an electric power source. The system includes a power distribution block having a switch socket with a first format, a device socket having a second format, associated with the switch socket to form a socket pair, a relay electrically coupling the switch socket to the device socket, and input power terminals electrically coupled to the socket pair and the relay, and configured to be electrically coupled to the electric power source. A switch wire harness includes a switch plug having a first complementary format configured to be removably received by the first format of the switch socket. A device wire harness includes a device plug having a second complementary format configured to be removably received by the second format of the device socket.

19 Claims, 27 Drawing Sheets

(56) References Cited

U.S. PATENT DOCUMENTS

| | | | |
|---|---|---|---|
| 8,053,669 B1* | 11/2011 | Sodini | B60R 16/0238 |
| | | | 174/59 |
| 2006/0178028 A1* | 8/2006 | Swiatek | H01R 24/58 |
| | | | 439/215 |

* cited by examiner

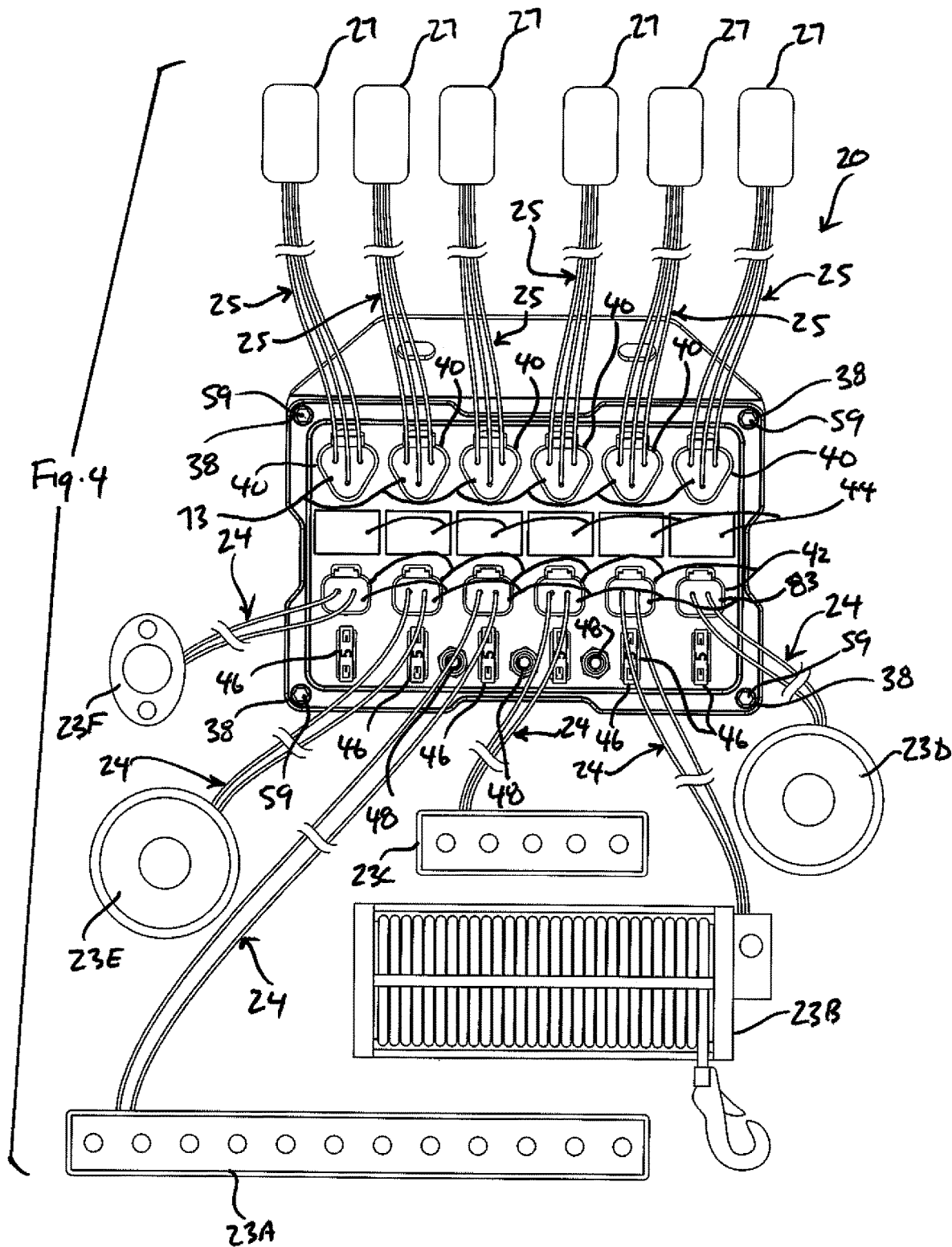

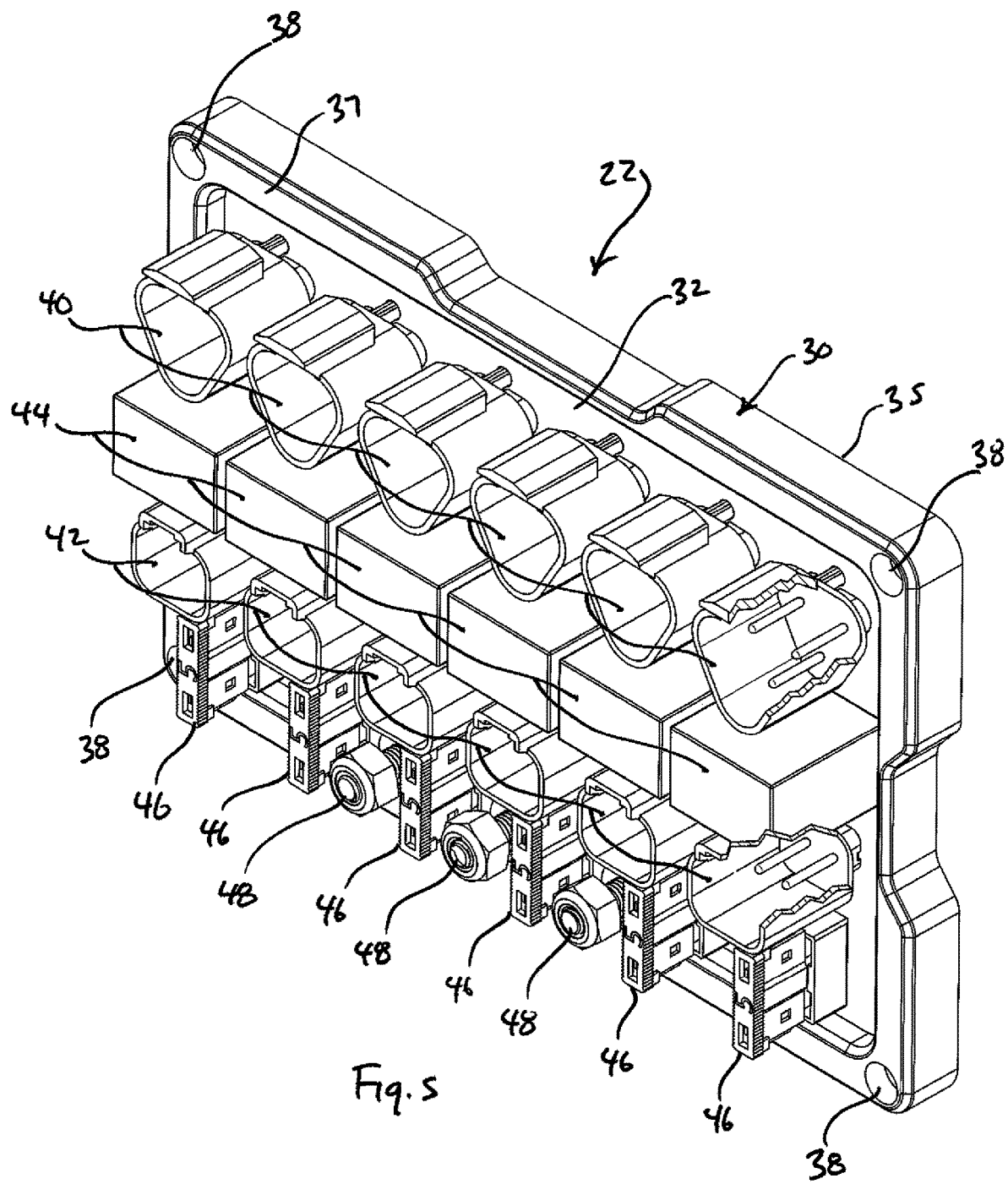

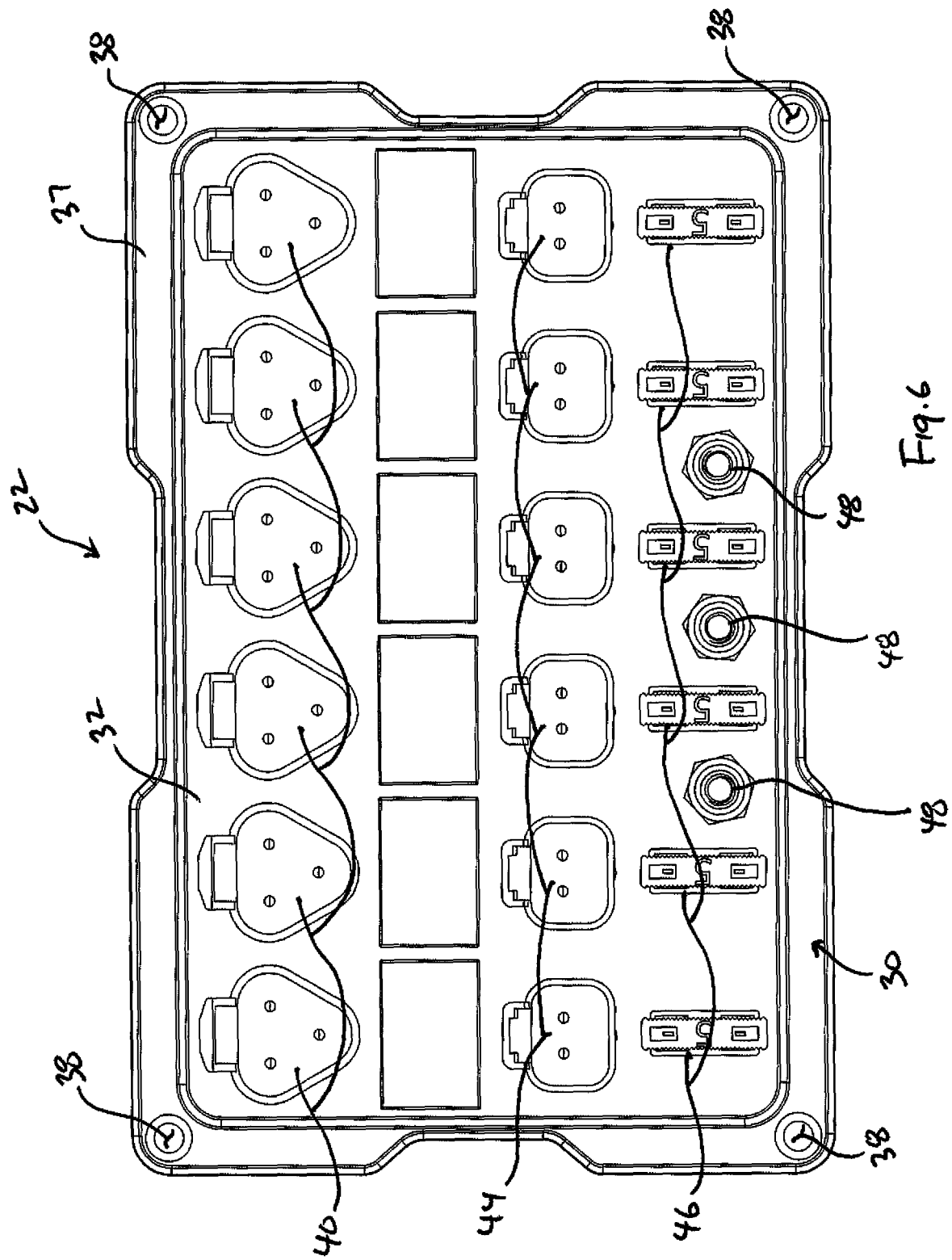

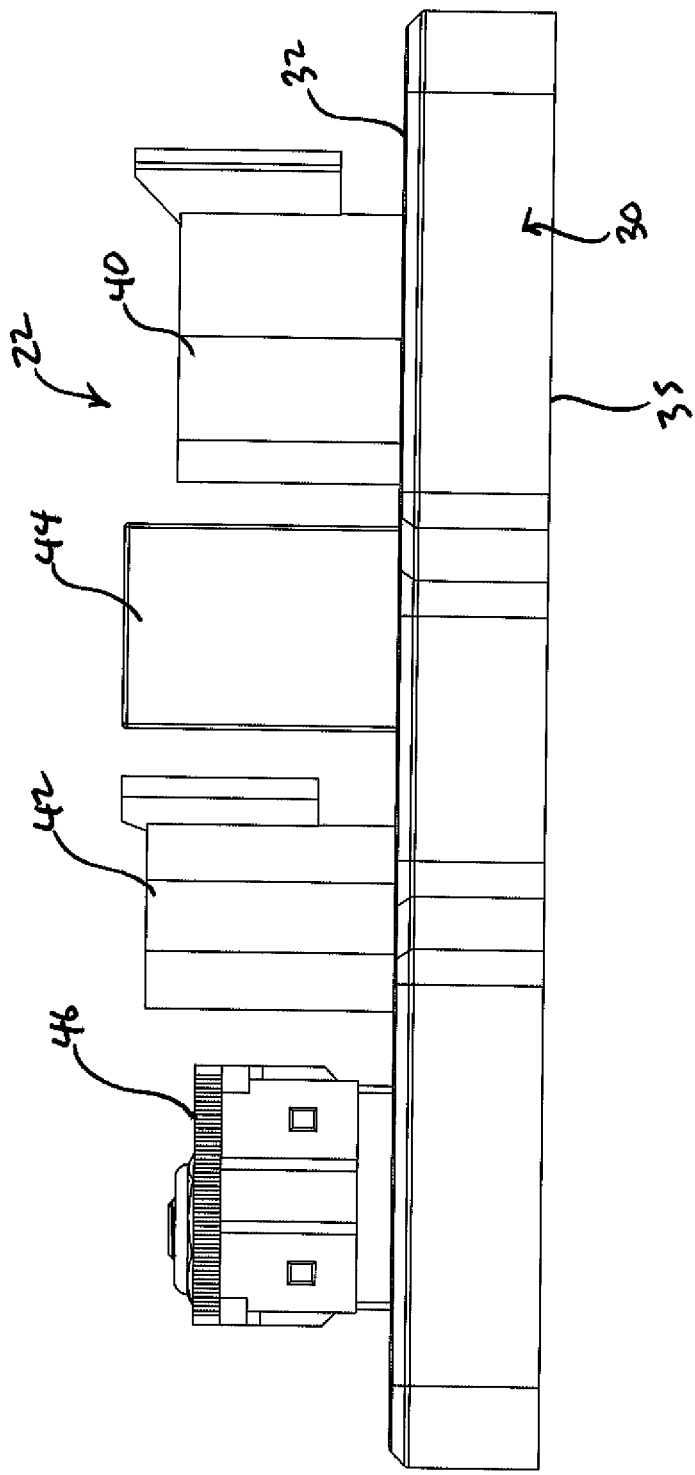

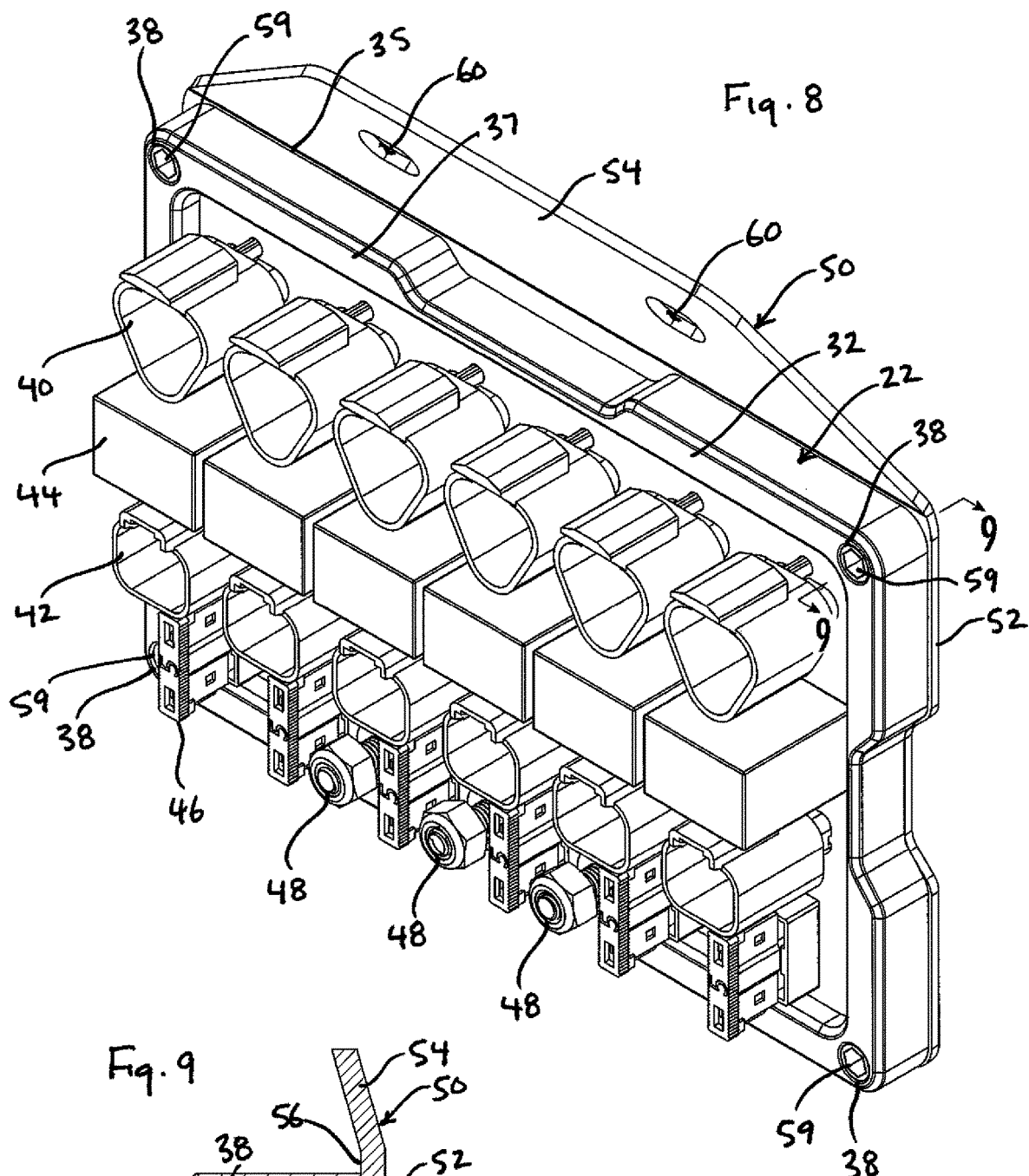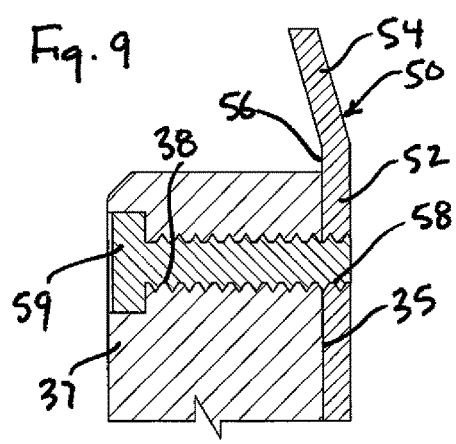

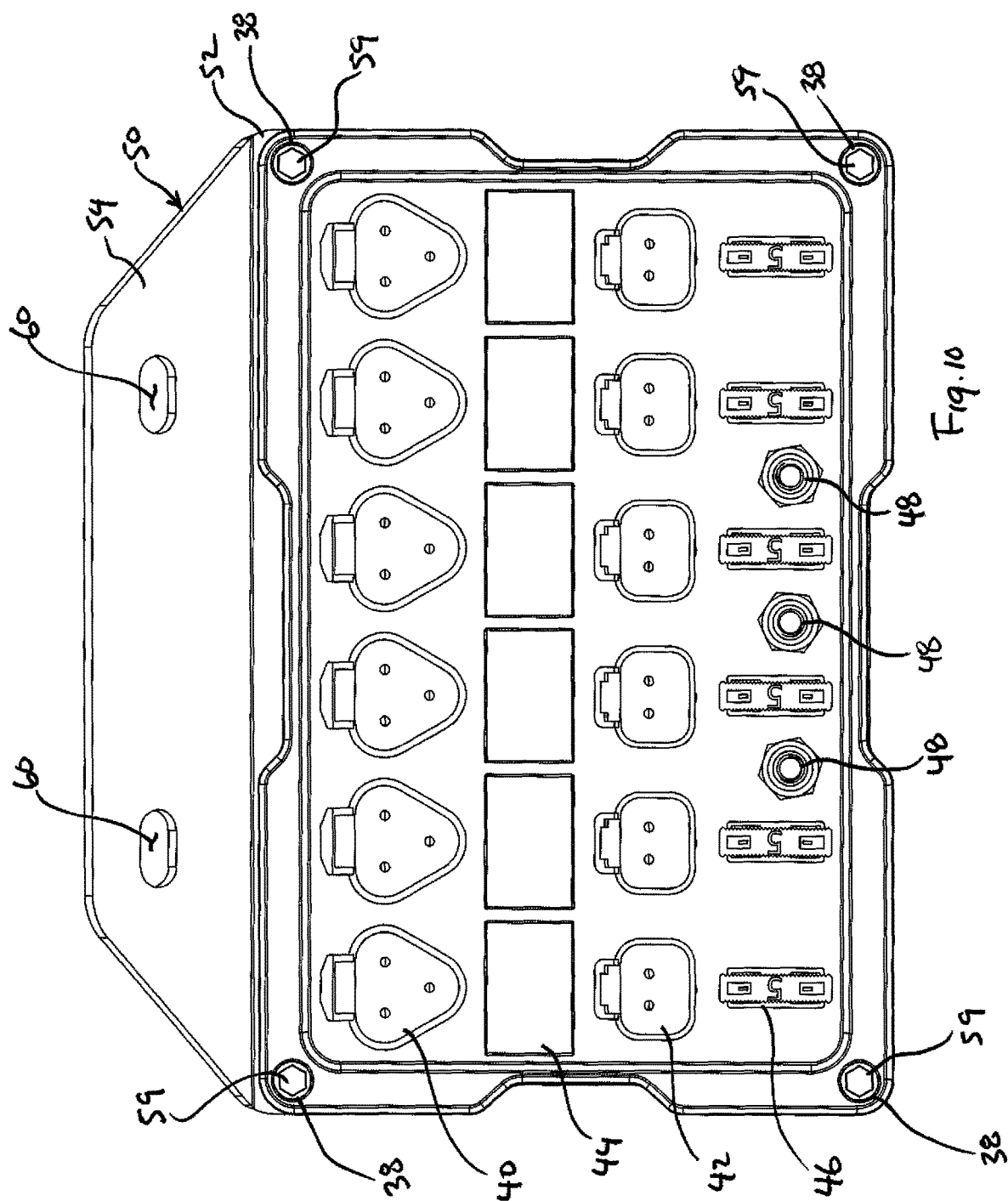

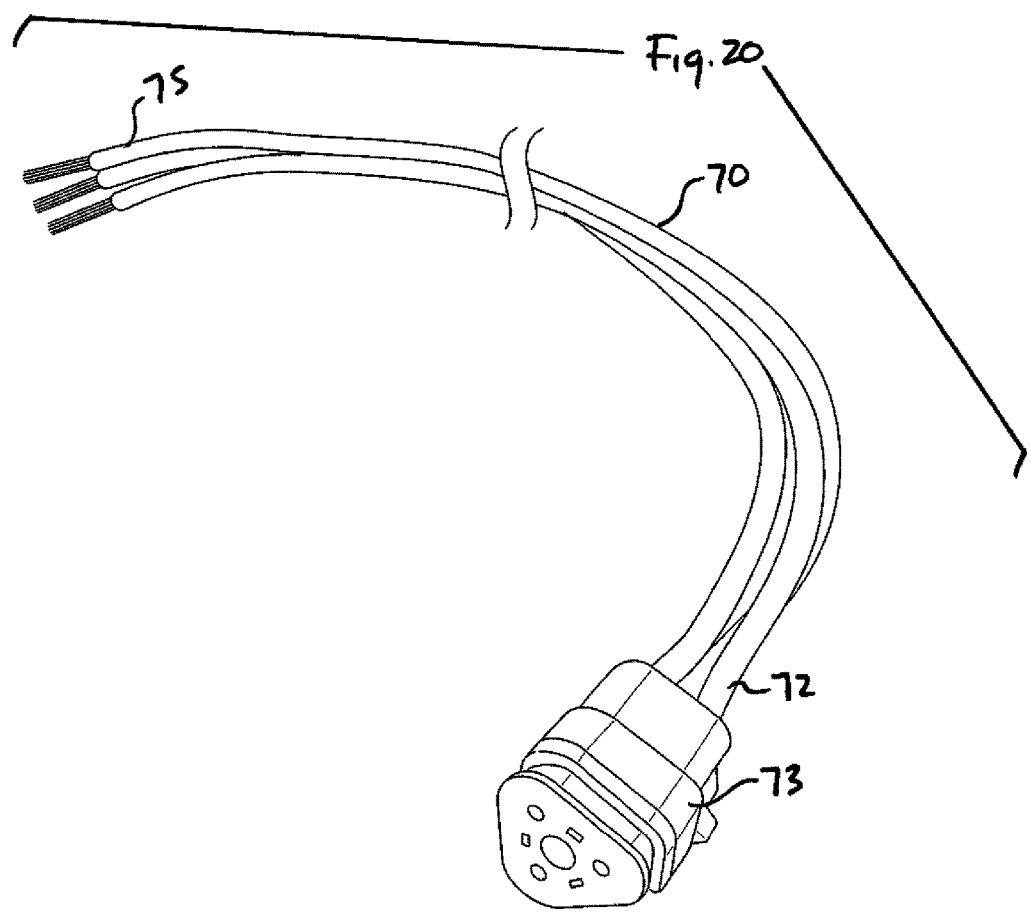
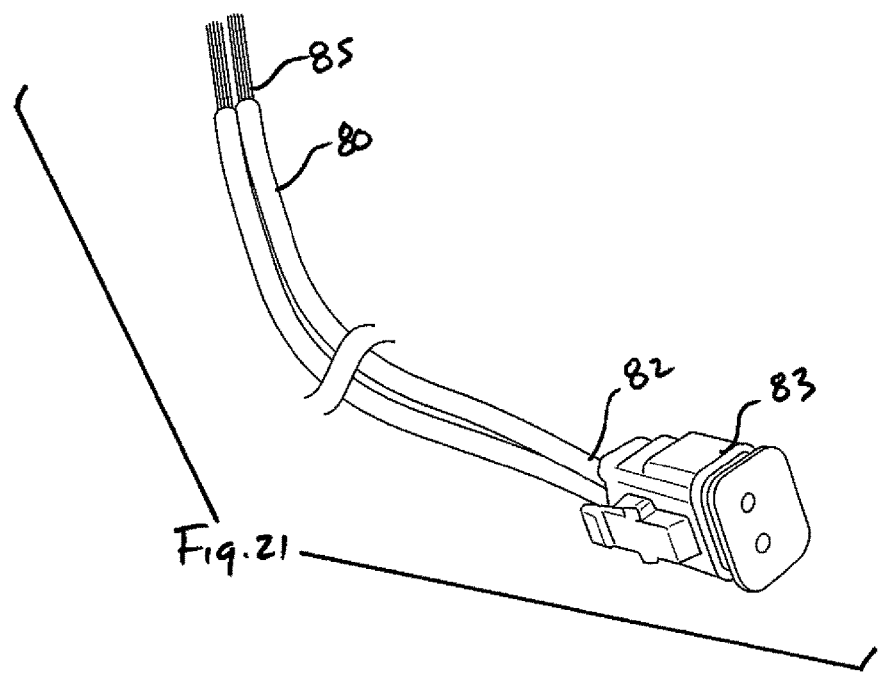

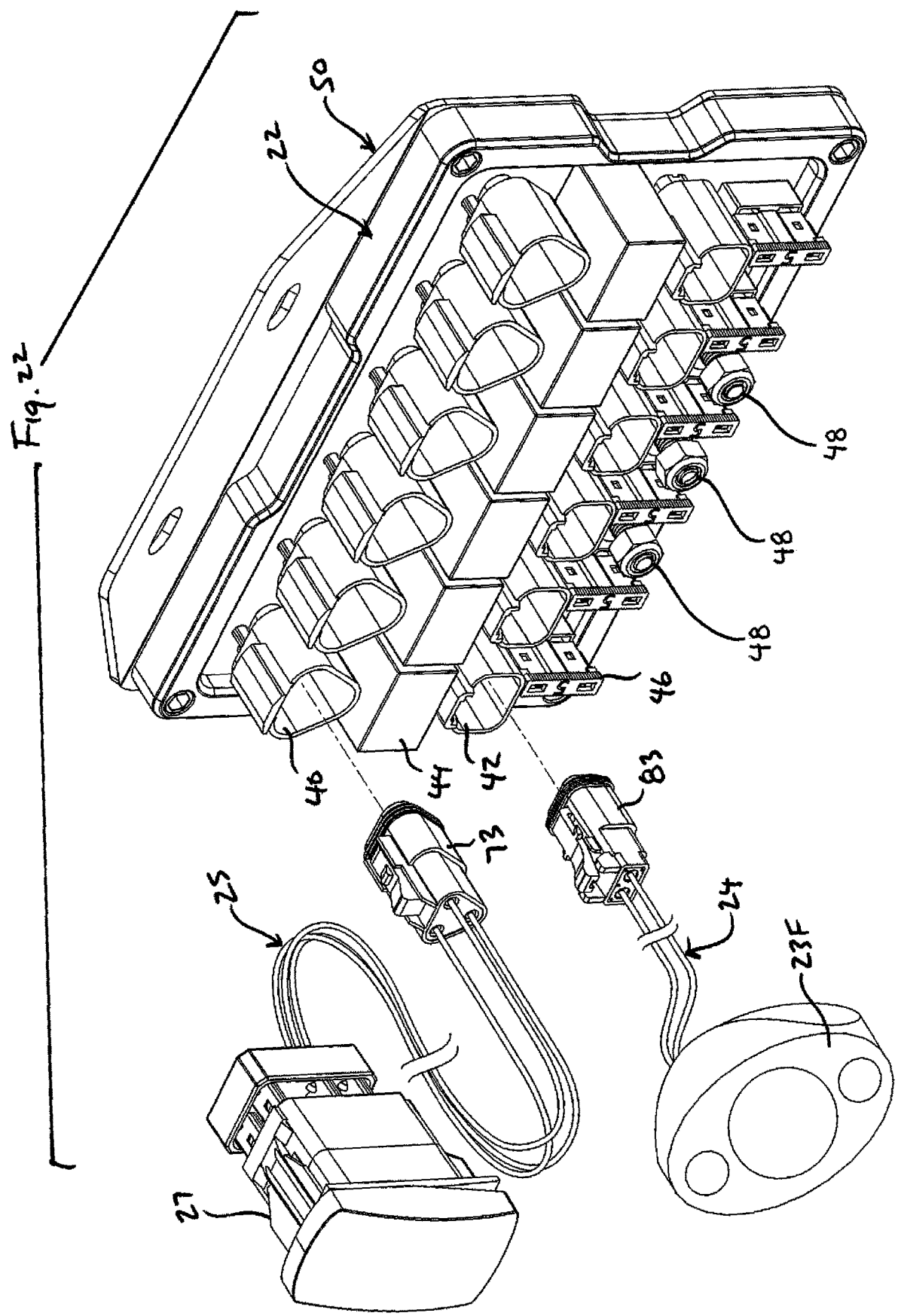

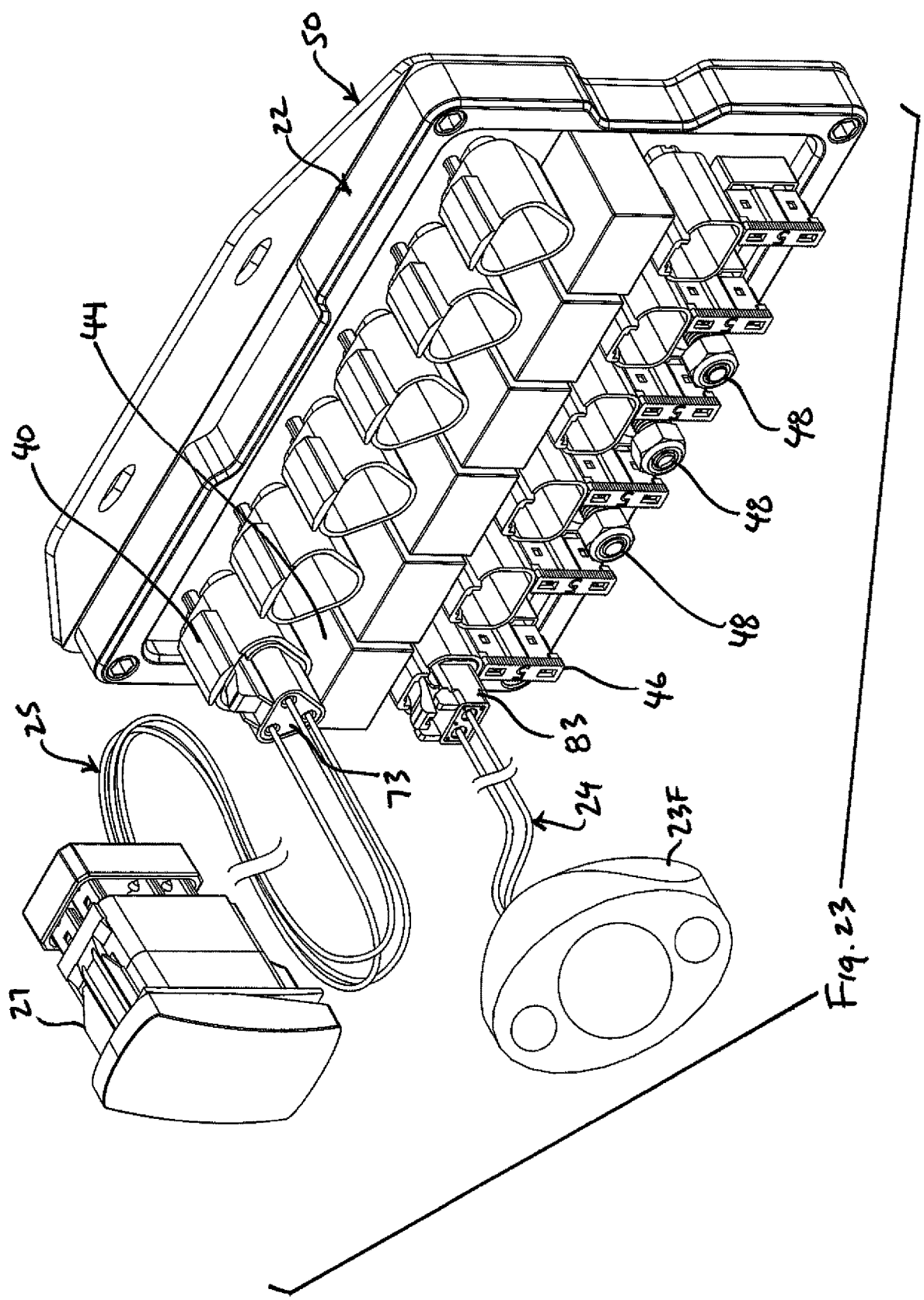

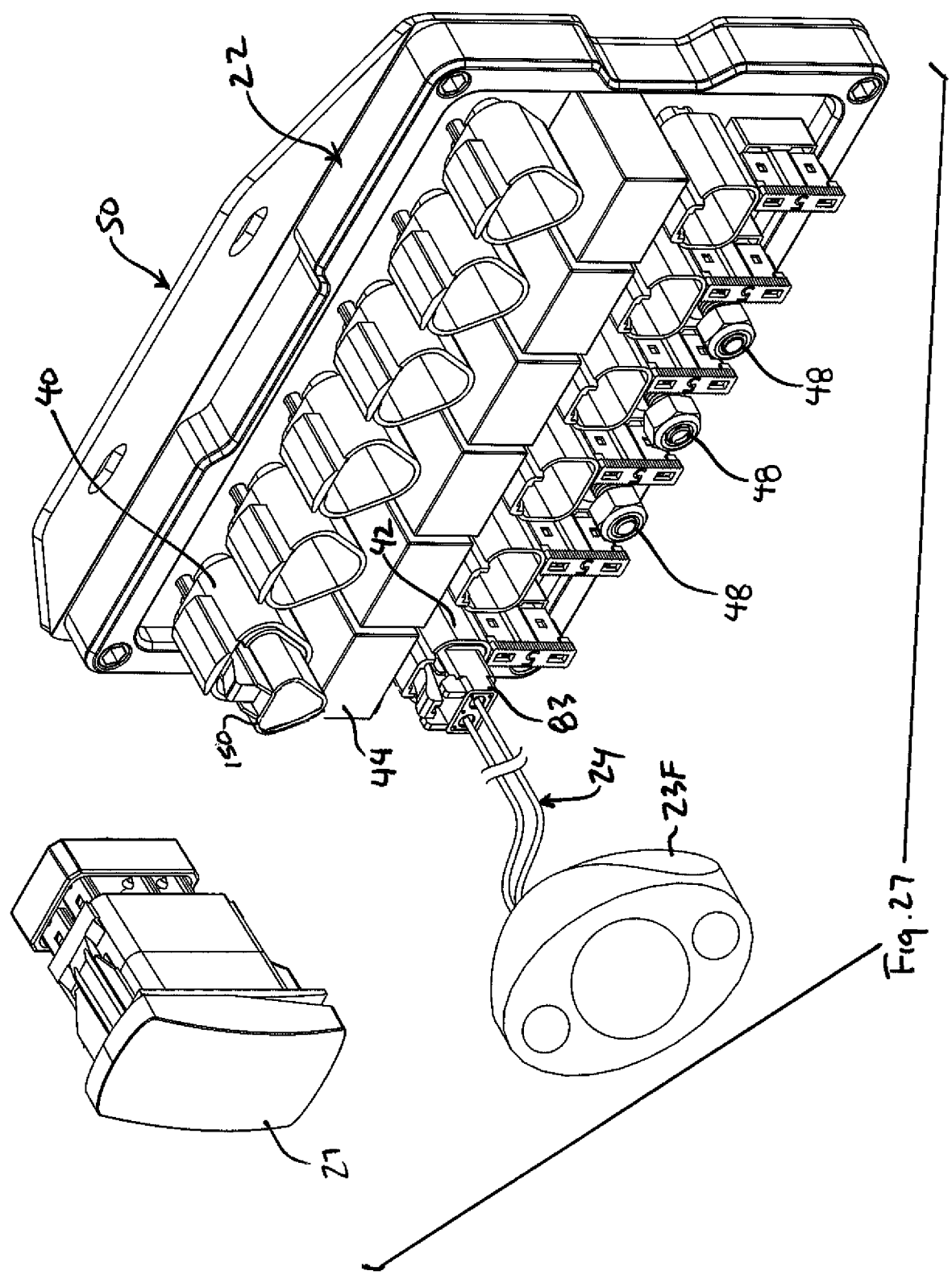

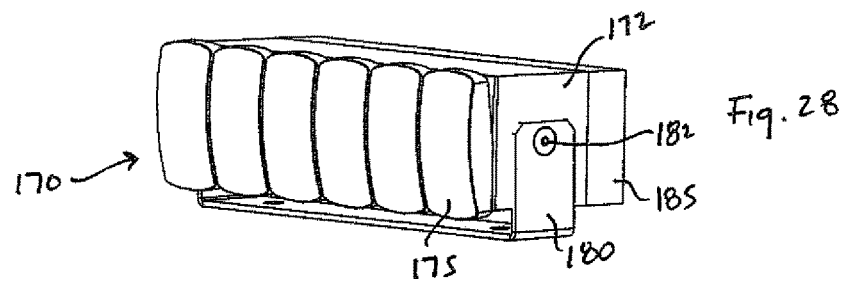
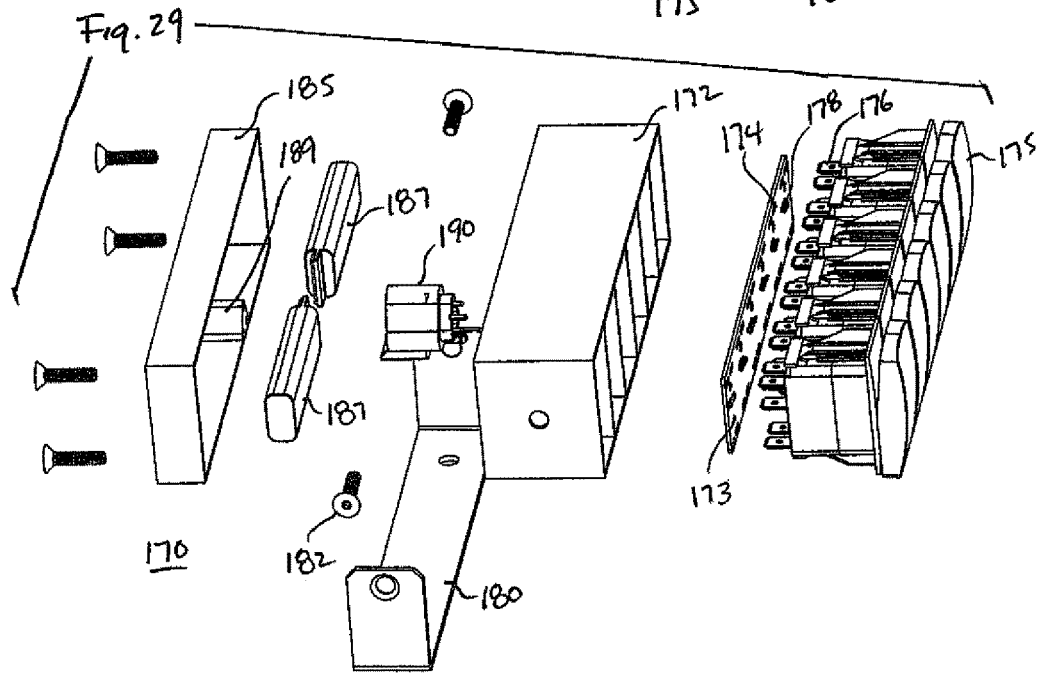
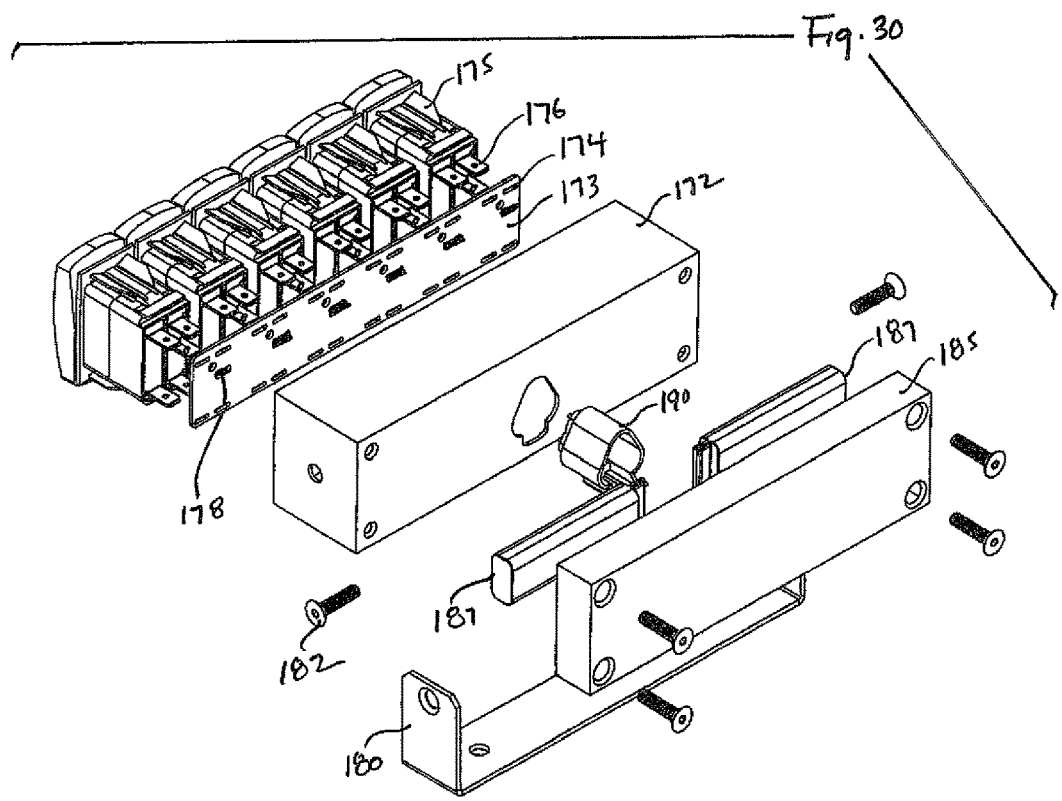

MODULAR PLUG-AND-PLAY POWER DISTRIBUTION SYSTEM FOR A VEHICLE

FIELD OF THE INVENTION

The present invention generally relates to electronic accessories for vehicles and, more particularly, to devices for adding aftermarket electrical accessories to vehicles.

BACKGROUND OF THE INVENTION

Adding electrically operated devices to a vehicle is a well-established custom for users of many vehicle types. Electrically operated devices such as spotlights, light bars, interior lights, and the like, in addition to electromechanical devices such as pumps, horns, winches, and the like, can add functionality and convenience to a vehicle. Unfortunately, installing aftermarket devices using a vehicle's electrical system often requires specialized skills. Many individuals desiring these devices have no idea how to install them properly. These devices are often wired directly to a vehicle's electrical system through the vehicle's fuse box. Other methods can be even more confusing and difficult for less technical individuals. Therefore, installing these devices requires one learn how to add discrete components to the existing electrical system available in the vehicle. Various lighting and other additions can also each take a separate circuit in the vehicle's fuse box, limiting the number of additions. To some, this may be a relatively simple process to learn. It is not easy for others and will likely be avoided by not adding additional devices or using professional technicians for the installation, increasing the cost substantially. Either way, there is a learning curve to overcome through study or previous knowledge. Furthermore, errors in installing devices can damage the vehicle or the devices. Accordingly, continued improvement in the art is evident.

SUMMARY OF THE INVENTION

Briefly, to achieve the desired objects and advantages of the instant invention, provided is a modular power distribution system. The modular power distribution system includes a power distribution block with a switch socket having a first format and a device socket having a second format different from the first format. The switch socket and the device socket form a designated socket pair. A relay electrically couples the switch socket to the device socket. The relay, when powered, closes a circuit between the switch socket and the device socket. Input power terminals electrically coupled to the socket pair and the relay are configured to be electrically coupled to an electric power source. A switch wire harness includes wiring having a plug end and a switch end. A switch plug is electrically coupled to the plug end. The switch plug has a first complemental format configured to be removably received by the first format of the switch socket. A device wire harness includes wiring having a plug end and a device end and a device plug electrically coupled to the plug end. The device plug has a second complemental format configured to be removably received by the second format of the device socket.

The power distribution block can further include a second switch socket having the first format and a second device socket having the second format. The second switch socket and the second device socket form a second designated socket pair distinguishable from the designated socket pair. A second relay electrically couples the second switch socket to the second device socket. The input power terminals are electrically coupled to the second designated socket pair and the second relay.

The designated socket pair is distinguished from the second designated socket pair by positioning the switch socket and the device socket of the designated socket pair in opposition to one another and positioning the second switch socket and the second device socket of the second designated socket pair in opposition to one another.

The modular power distribution system can include a signal receiver coupled to the switch socket and the switch wire harness replaced with a control unit. The control unit includes a signal generator which is selectively operable. The signal generator selectively generates a signal associated with the signal receiver to close a circuit between the switch socket and the device socket.

Also provided is a method of installing electrically operated devices on a vehicle. The method includes providing a vehicle with an electric power source. Providing a power distribution block including a switch socket having a first format and a device socket having a second format different from the first format. The switch socket and the device socket form a designated socket pair. A relay electrically couples the switch socket to the device socket. Input power terminals are electrically coupled to the socket pair and the relay. Additional steps include mounting the power distribution block to the vehicle and connecting the electric power source to the input power terminals of the power distribution block. The relay is automatically closed upon being powered by the electric power source, closing a circuit between the switch socket and the device socket. A further step includes providing a switch wire harness including wiring having a plug end and a switch end, a switch plug electrically coupled to the plug end, the switch plug having a first complemental format configured to be removably received by the first format of the switch socket. Inserting the switch plug into the switch socket. A method according to the invention further includes providing a device harness including wiring having a plug end and a device end, a device plug electrically coupled to the plug end, and the device plug having a second complemental format configured to be removably received by the second format of the device socket. Further steps then include inserting the device plug into the device socket, coupling a switch to the switch end, coupling a device to the device end, and operating the device using the switch.

BRIEF DESCRIPTION OF THE DRAWINGS

Specific objects and advantages of the invention will become readily apparent to those skilled in the art from the following detailed description of illustrative embodiments thereof, taken in conjunction with the drawings in which:

FIG. 4 is a top view of the modular power distribution system according to the present invention with attached devices;

FIG. 5 is a perspective view of a power distribution block of the modular power distribution system of FIG. 4;

FIG. 6 is a top view of the power distribution block of FIG. 5;

FIG. 7 is a side view of the power distribution block of FIG. 5;

FIG. 8 is a perspective view of the power distribution block of the modular power distribution system of FIG. 4 with attached mounting plate;

FIG. 9 is a partial sectional view of the modular power distribution block taken along lines 9-9 of FIG. 8;

FIG. 10 is a top view of the power distribution block with attached mounting plate of FIG. 8;

FIG. 20 is a perspective view of a switch wire harness with free ends of wires for switch connection;

FIG. 21 is a perspective view of a device wire harness with free ends of wires for device connection;

FIG. 22 is a perspective view of the power distribution block of the modular power distribution system of FIG. 4 illustrating a switch wire harness and a device wire harness position for attachment to a socket pair;

FIG. 23 is a perspective view of the power distribution block of the modular power distribution system of FIG. 22 illustrating a switch wire harness and a device wire harness attached to a socket pair;

FIG. 27 is a perspective view of the power distribution block of a wireless switch embodiment of the modular power distribution system;

FIG. 28 is a perspective view of a wireless switch assembly according to the present invention;

FIG. 29 is a front exploded view of the wireless switch assembly of FIG. 28;

FIG. 30 is a rear exploded view of the wireless switch assembly of FIG. 28;

DETAILED DESCRIPTION

Figure 1:
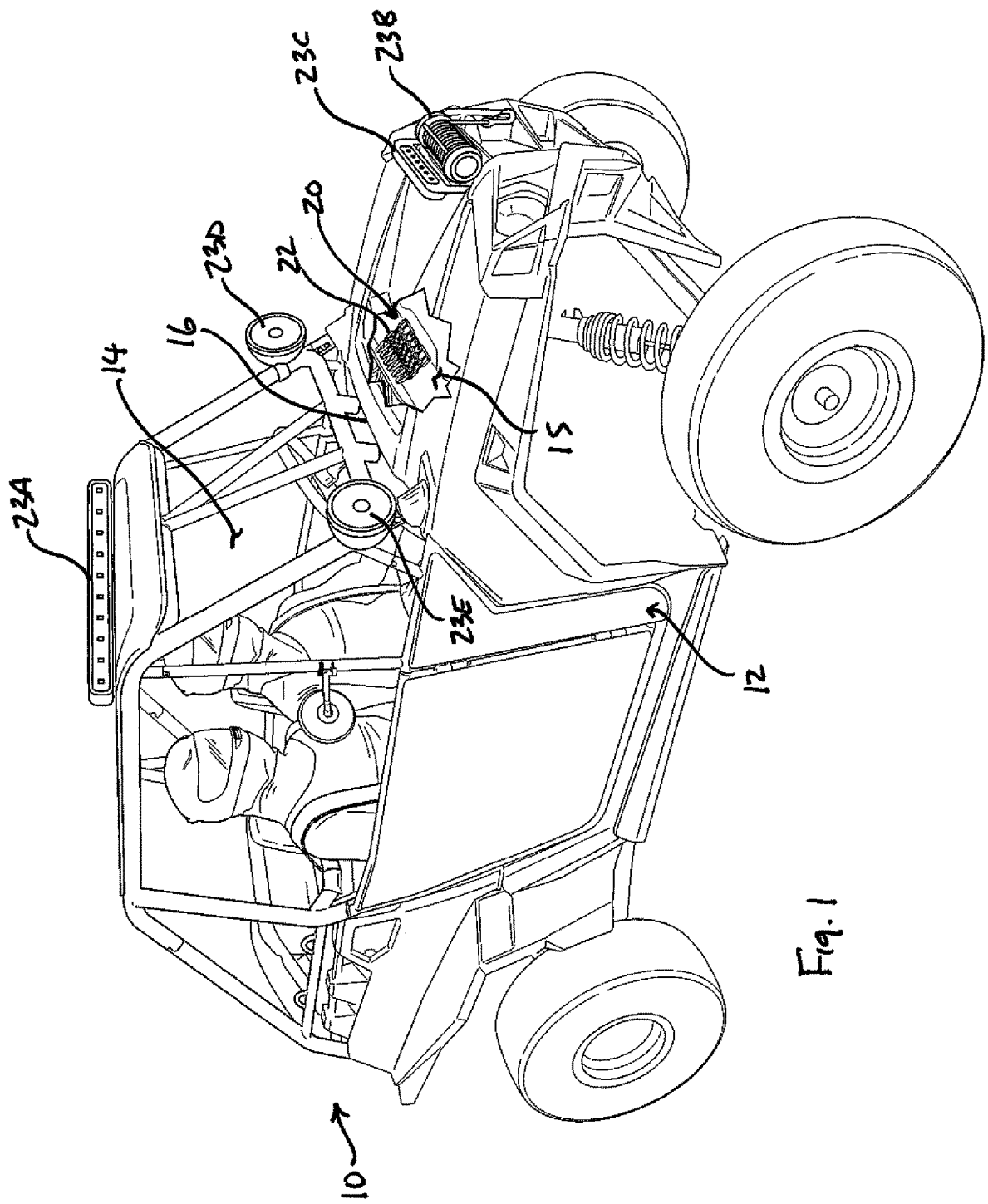
FIG. 1 is a perspective view of a vehicle incorporating a modular power distribution system according to the invention.
Figure 2:
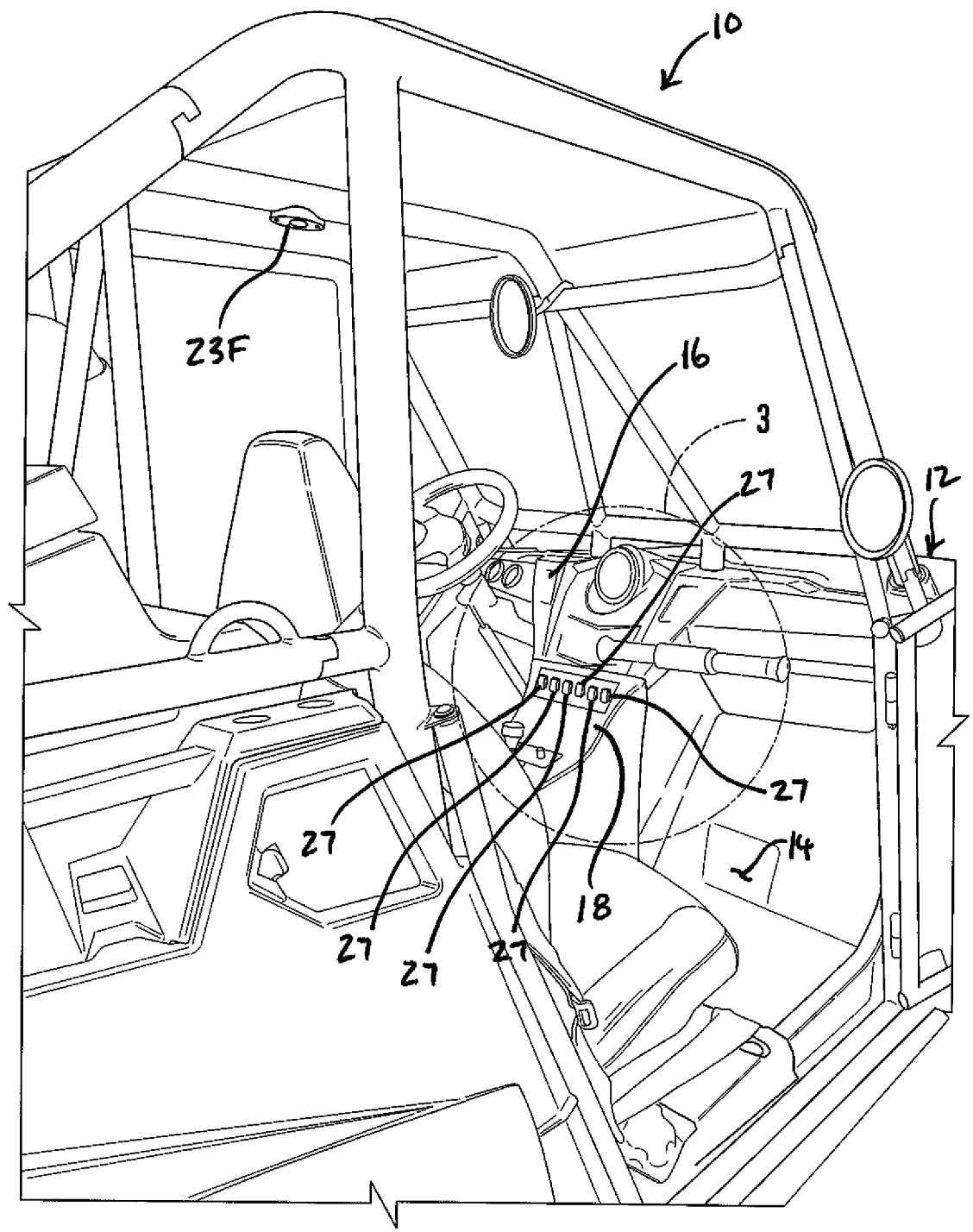
FIG. 2 is a partial view of an interior cockpit of the vehicle of FIG. 1.
Figure 3:
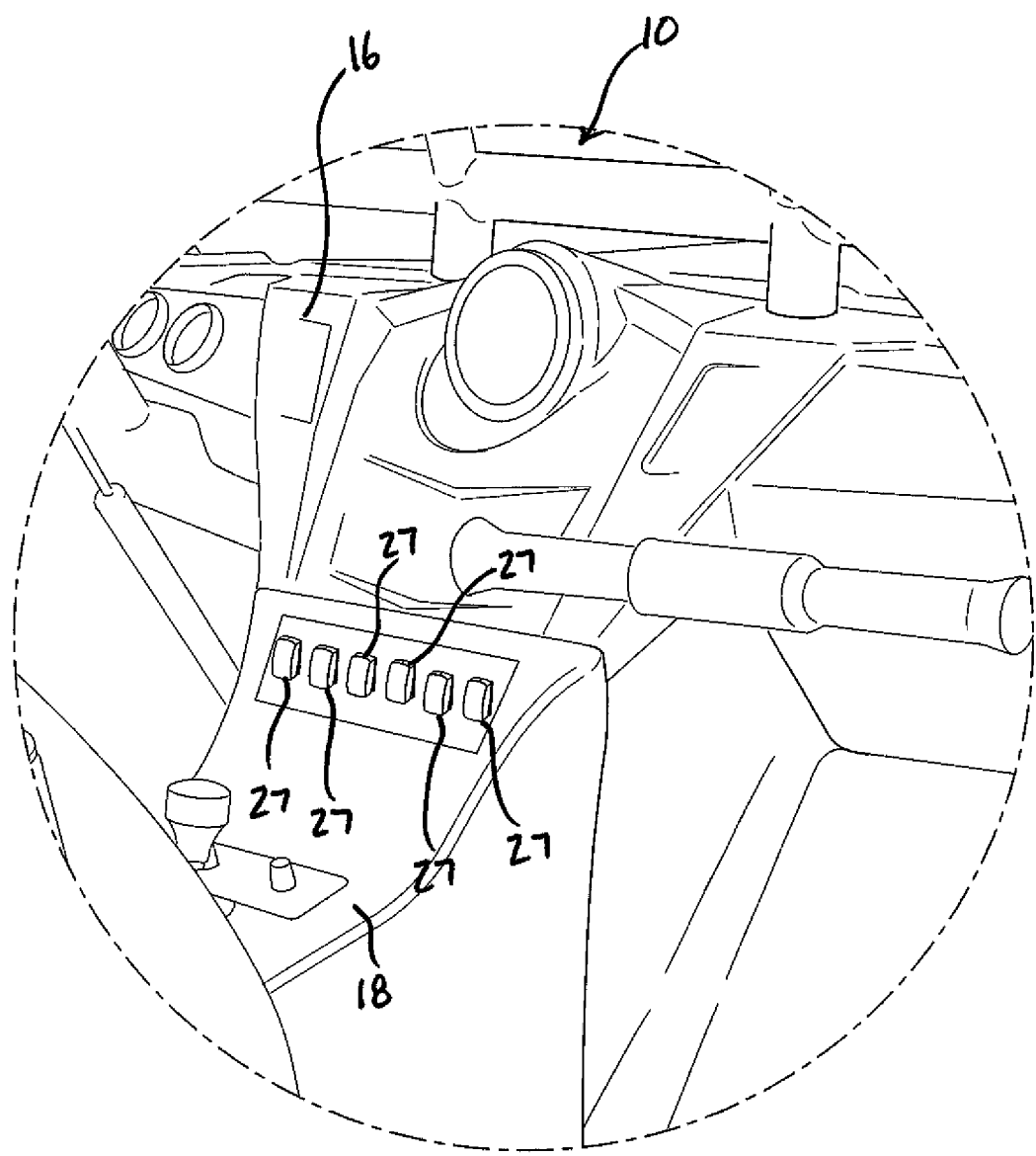
FIG. 3 is an enlarged perspective view of a center console of the vehicle as designated by circle 3 in FIG. 2.

Turning now to the drawings, like reference characters indicating corresponding elements throughout the several views, FIGS. 1-3 illustrate a vehicle generally designated 10. Referring in relevant part to FIGS. 1-3, vehicle 10 in this specific embodiment is an off-road vehicle having a body 12 defining a vehicle cockpit 14 rearward of an engine compartment 15 housing an engine and other standard components. A dashboard 16 with a center console 18 separates engine compartment 15 from vehicle cockpit 14. A modular power distribution system, generally designated 20 in FIG. 1, is installed in vehicle 10. While vehicle 10 is an off-road vehicle in this embodiment, the person having ordinary skill in the art will readily appreciate that modular power distribution system 20 is useful with other ground transportation vehicles such as cars, trucks, busses and the like. Furthermore, the term "vehicle" as used herein, is not limited to ground transportation vehicles. Modular power distribution system 20 is useful for installing electrical accessories to the electrical power source of other vehicles, including boats, aircraft, or any other vehicle having an electrical power source.

With additional reference to FIG. 4, illustrated is a preferred embodiment of modular power distribution system 20. Modular power distribution system 20 includes a power distribution block 22 coupled between a power system of vehicle 10, described below, and at least one device 23. Device 23 is chosen from various electronically operated accessories such as pumps, horns, lights, etc. While modular power distribution system 20 can include a single device 23, it incorporates six devices 23 in FIGS. 1, 2, and 4, although it can incorporate less or more devices 23. In this example, device 23A is a bar light mounted on top of body 12 above vehicle cockpit 14, device 23B is an electric winch mounted on the front of body 12 forward of engine compartment 15, and device 23C is a bar light 23C mounted on the front of body 12 above the electric winch 23B. Device 23D is a spotlight mounted on one side of body 12 proximate to the front of vehicle cockpit 14, device 23E is a spotlight on the opposing side of body 12, and device 23F is an interior light 23F mounted within vehicle cockpit 14 in FIG. 2. Devices 23 are presented by way of example to show the diversity of the different devices capable of being used with modular power distribution system 20. Each device 23 is coupled to the power system of the vehicle through power distribution block 22.

In FIG. 4, system 20 includes device wire harnesses 24 coupling devices 23 to power distribution block 22 and switch wire harnesses 25 coupling switches 27 to power distribution block 22. In FIGS. 2 and 3, switches 27 are mounted on center console 18 of dashboard 16 for convenient access, and other accessible locations are useful in alternative embodiments. Modular power distribution system 20 is an exemplary plug-and-play system including modular or self-contained components, namely switch wire harnesses 25, switches 27, device wire harnesses 24, and devices 23, configured to be easily connected without confusion, the use of specialized tools, or the need for specialized skill. Device wire harnesses 24 and switch wire harnesses 25 have different formats for coupling to power distribution module 22. The different formats between device wire harnesses 24 and switch wire harnesses 25 prevent the unknowing interchanging of these parts.

In FIGS. 5-7, power distribution block 22 is entirely self-contained. It includes a base 30 with a front side 32, a back side 35, and a peripheral edge 37 with threaded apertures 38 formed through the corners thereof, extending from the front side 32 to the back side 35. With additional reference to FIG. 4, power distribution block 22 further includes switch sockets 40, device sockets 42, relays 44, fuses 46, and terminals 48. In FIGS. 5-7, switch sockets 40 extend from front side 32 of base 30 in an array or bank of switch sockets 40, and device sockets 42 extend from front side 32 of base 30 in an array or bank of device sockets 42. Relays 44 extend from front side 32 of base 30 in an array or bank of relays 44, and fuses 46 extend from front side 32 of base 30 in an array or bank of fuses 46. Each switch socket 40 from the array of switch sockets 40 associates with a different device socket 42 of the array of device sockets 42. In this manner, one switch socket 40 and one device socket 42 form a socket pair electrically coupled by an associated relay 44 from the array of relays 44. Thus, each relay 44 of the array of relays 44 associates with one socket pair. In addition, each fuse 46 of the array of fuses 46 associates with one socket pair. The switch socket 40 and device socket 42 of each socket pair directly oppose one another clearly and un-mistakenly designating each pair of sockets 40 and 42. To achieve this positioning, switch sockets 40 and device sockets 42 are each formed in their respective array, each array is linear, and the arrays are parallel to one another. In this embodiment, relays 44 are each between their associated socket pair. However, the positioning of relays 44 is not critical because the user does not interact with relays 44 during installation. Accordingly, relays 44 can be positioned in any convenient location. The described relationship of each socket pair visually and positionally designates the socket pairs from one another to the ordinary observer.

In FIGS. 4, 5, and 6, switch sockets 40 and device sockets 42 have different formats. For example, each switch socket 40 is a triangular shape with a three-prong connector. Each device socket 42 is a rectangular shape with a two-prong connector. The formats of switch sockets 40 are identical, the formats of device sockets 42 are identical, and the formats of switch sockets 40 are different from the formats of device sockets 42. The different formats of the switch sockets 40 from the device sockets 42 disable unintentional connection of the wrong components and enable the fitting of only the correct components. Other different formats are useful. Power input terminals 48 are configured to be coupled to a vehicle's electrical power source for powering power distribution block 22 and each switch and device component coupled to power distribution block 22.

Figure 11:
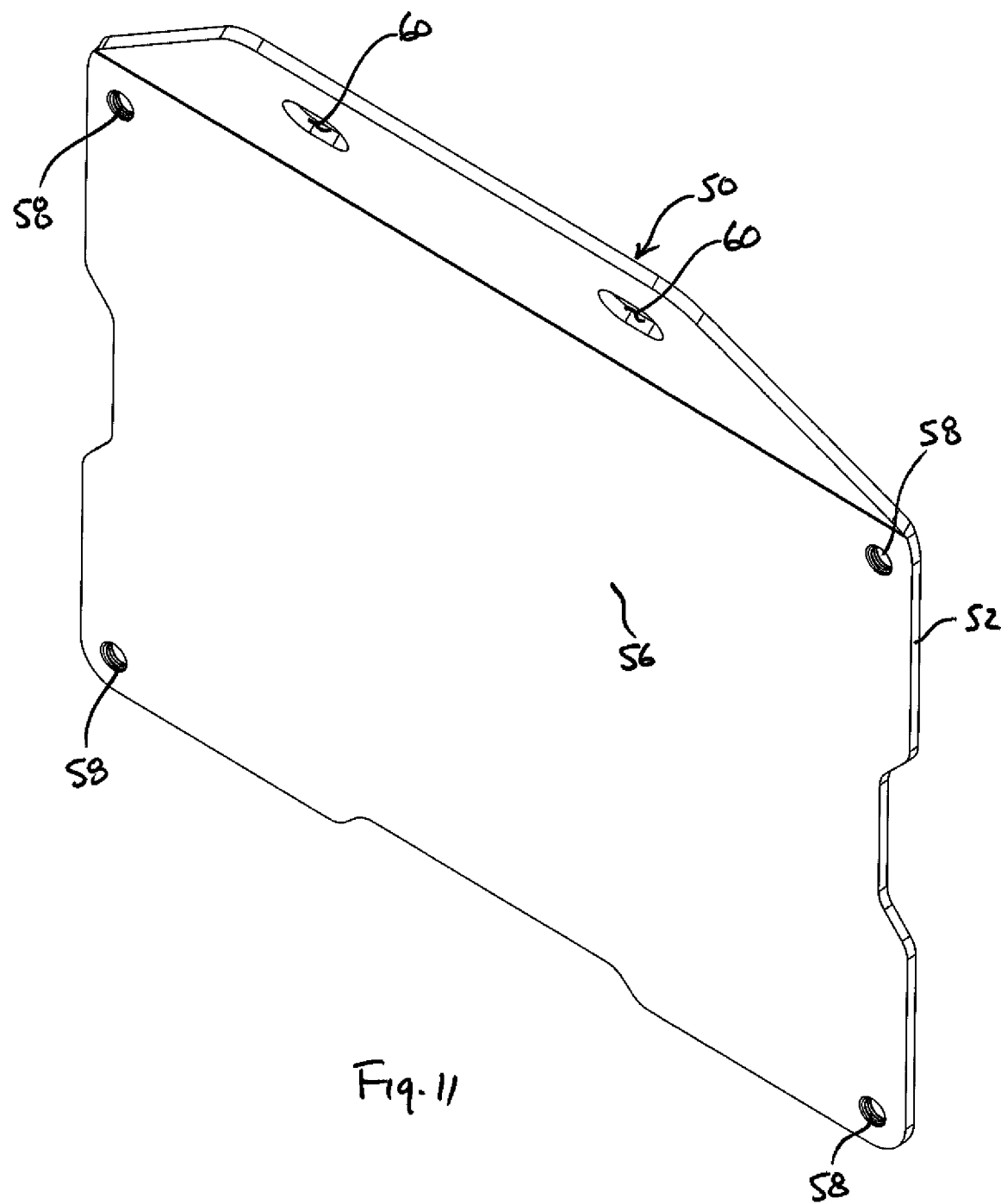
FIG. 11 is a perspective view of the mounting plate of FIG. 8.
Figure 12:
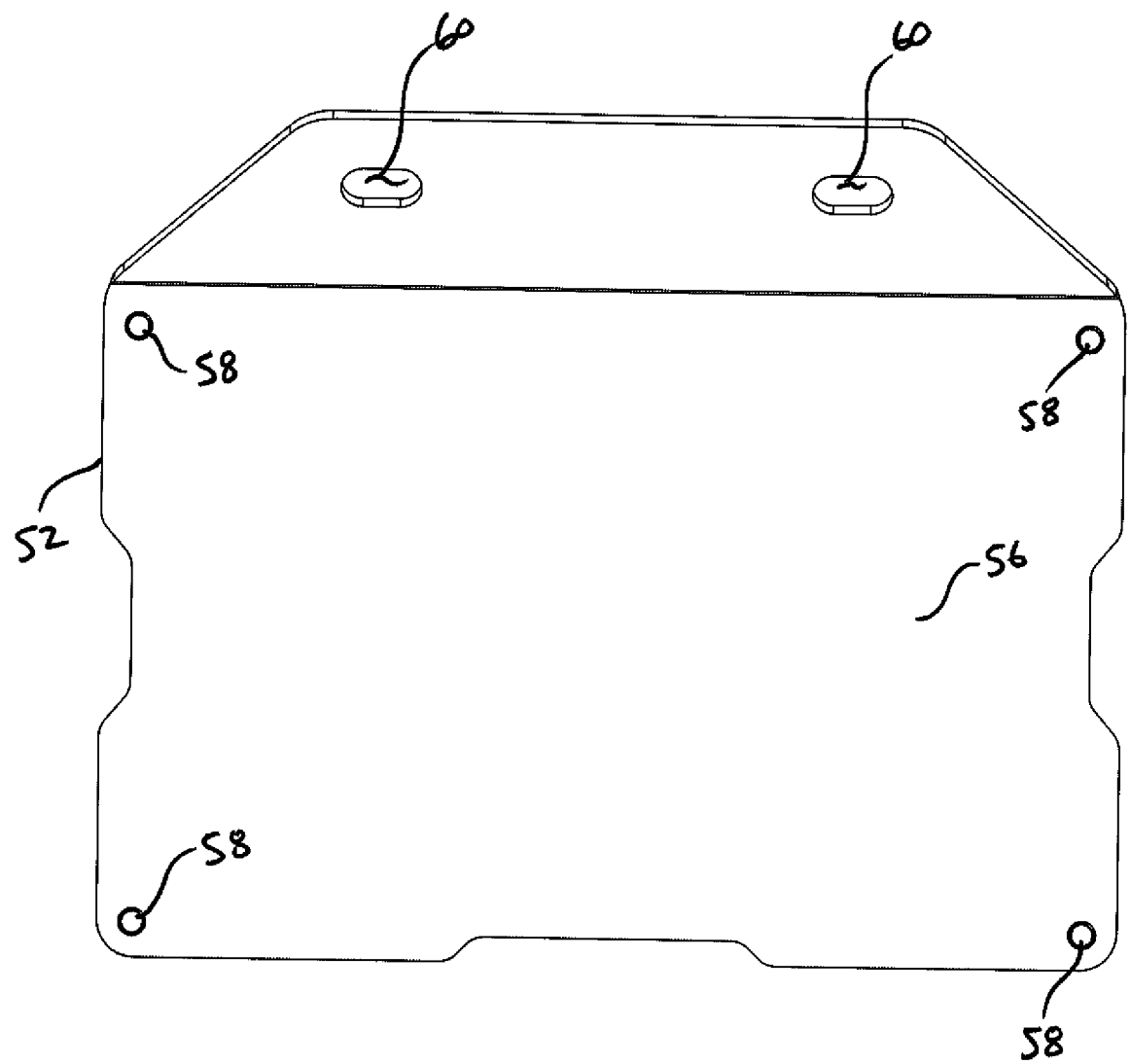
FIG. 12 is a top view of the mounting plate of FIG. 11.

In FIGS. 8 and 10, power distribution block 22 is fixed to a mounting plate 50. Referring also to FIGS. 11 and 12, mounting plate 50 includes a support portion 52 and a hanger portion 54 that extends at an angle from support portion 52. Support portion 52 has a top surface 56 configured to receive thereon back side 35 of power distribution block 22. Threaded apertures 58 extending through support portion 52 of mounting plate 50 proximate to the corners thereof align with threaded apertures 38 extending through power distribution block 22 when power distribution block 22 is properly positioned on top surface 56. Fastener openings 60 through hanger portion 54 accommodate fasteners to secure mounting plate 50 to vehicle 10 releasably. FIG. 9 is an enlarged sectional view of an attachment point between power distribution block 22 and mounting plate 50. A screw 59 threaded concurrently through threaded aperture 38 of power distribution block 22 and threaded aperture 58 of support portion 52 secures power distribution block 22 to mounting plate 50. Screw 59 is countersunk to provide a flush interface with peripheral edge 37.

Figure 13:
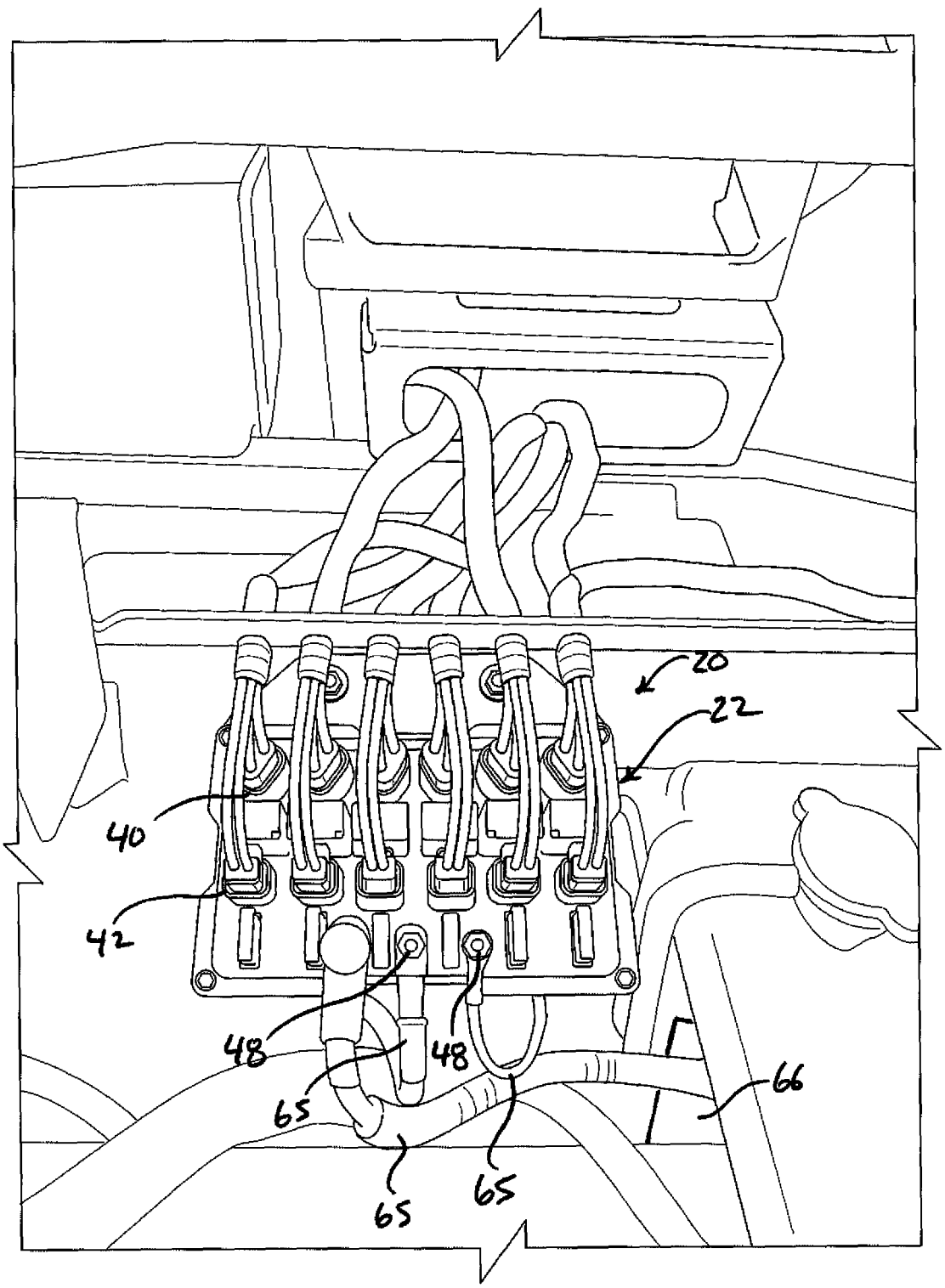
FIG. 13 is a partial top perspective view of the engine compartment of the vehicle illustrating a portion of the modular power distribution system mounted therein.

With additional reference to FIG. 13, mounting plate 50 serves to attached power distribution block 22 to vehicle 10. Mounting plate 50 can attach power distribution block 22 to any convenient location. In this embodiment, mounting plate 50 secures power distribution block 22 within engine compartment 15 to a firewall or other structure, in this case a frame member 62 receiving hanger portion 54 there against. Fasteners, such as nuts and bolts, clips, ties, and the like, extend through fastener openings 60 and engage frame member 62, fixedly attaching mounting plate to vehicle 10. Power cables 65 extend from an electrical power source 66 of vehicle 10 and attach conventionally to power input terminals 48. Typically, cables 65 are a power, ground, and ignition lines.

Figure 14:
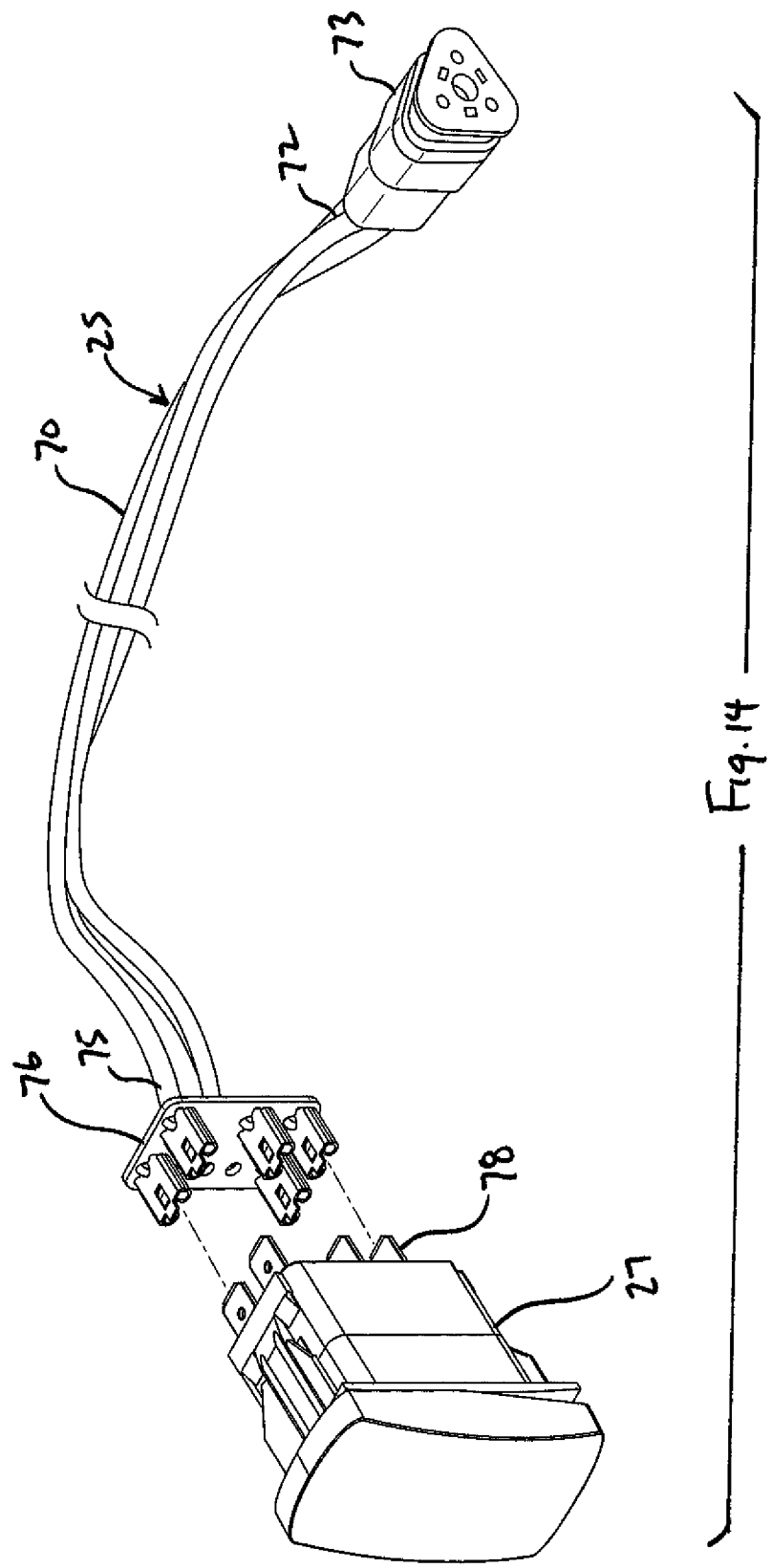
FIG. 14 is a top perspective view of a switch wire harness and unattached switch.
Figure 15:
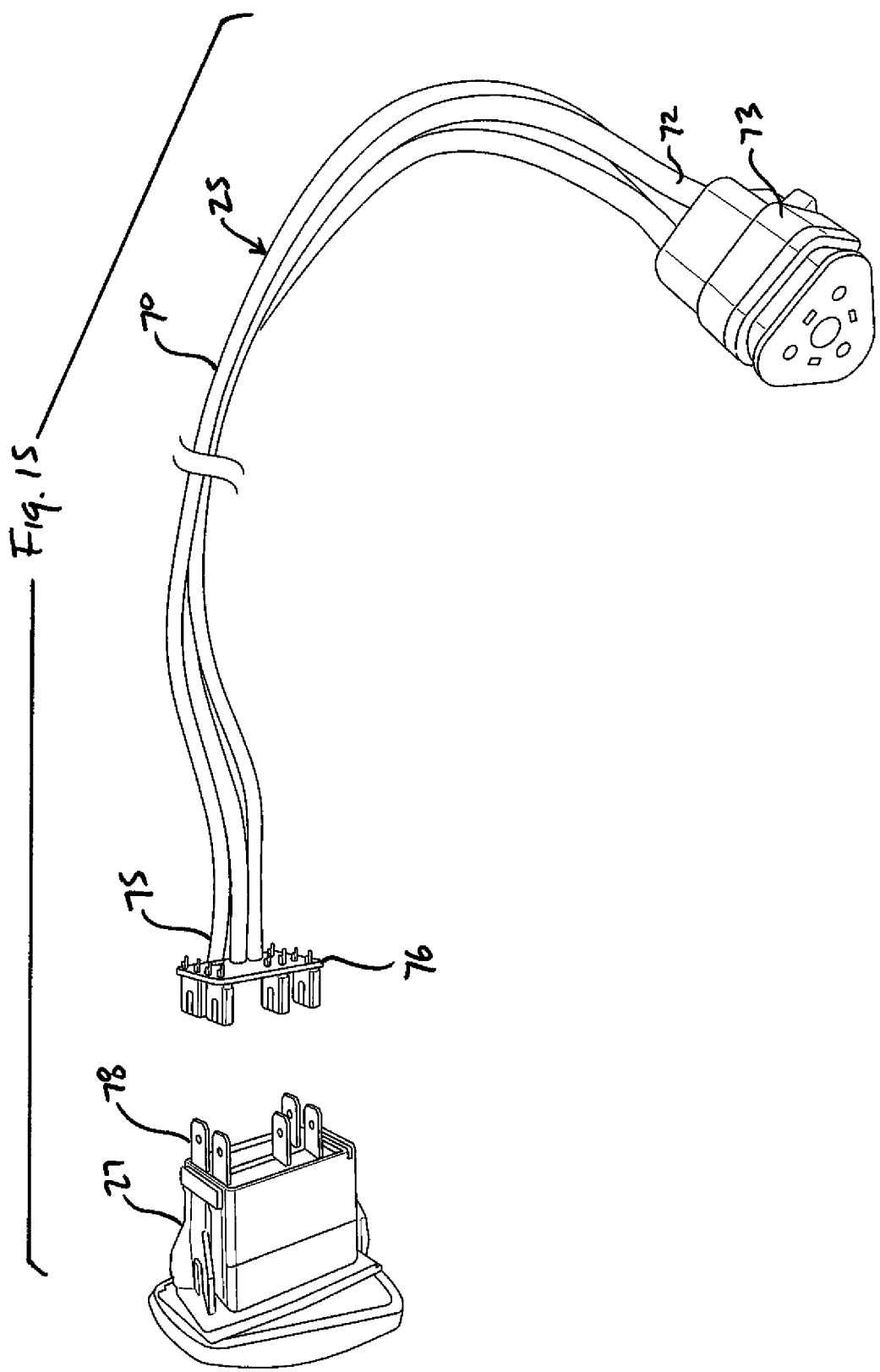
FIG. 15 is a side perspective view of the switch wire harness and unattached switch of FIG. 14.
Figure 16:
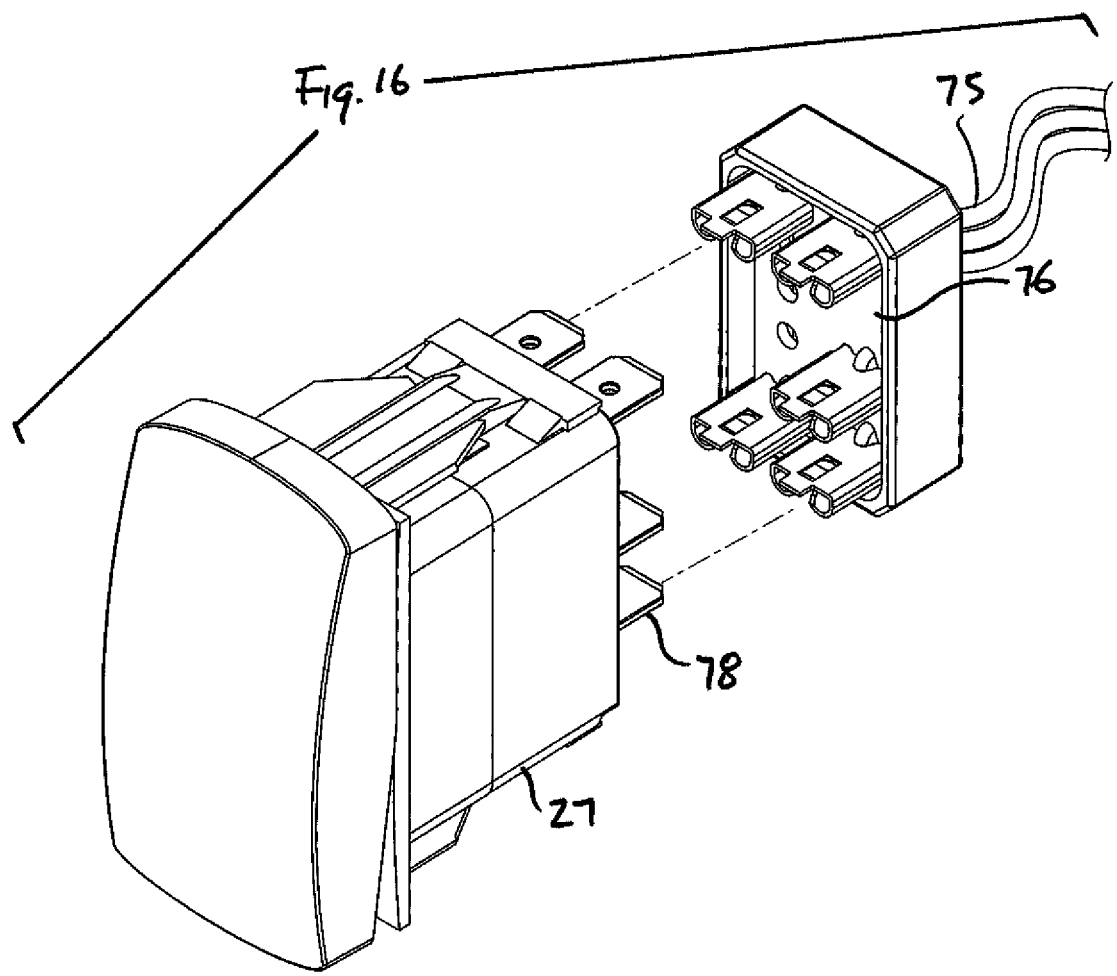
FIG. 16 is an enlarged perspective view of the uncoupled switch and switch connector.
Figure 17:
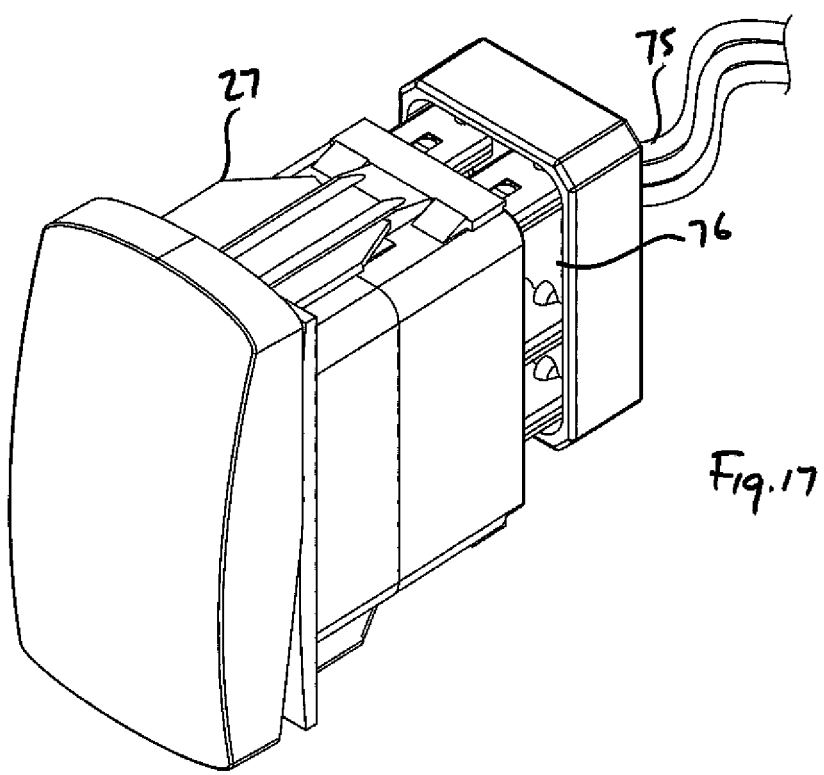
FIG. 17 is an enlarged perspective view of the switch and switch connector of FIG. 16 coupled together with the switch in the off position.
Figure 18:
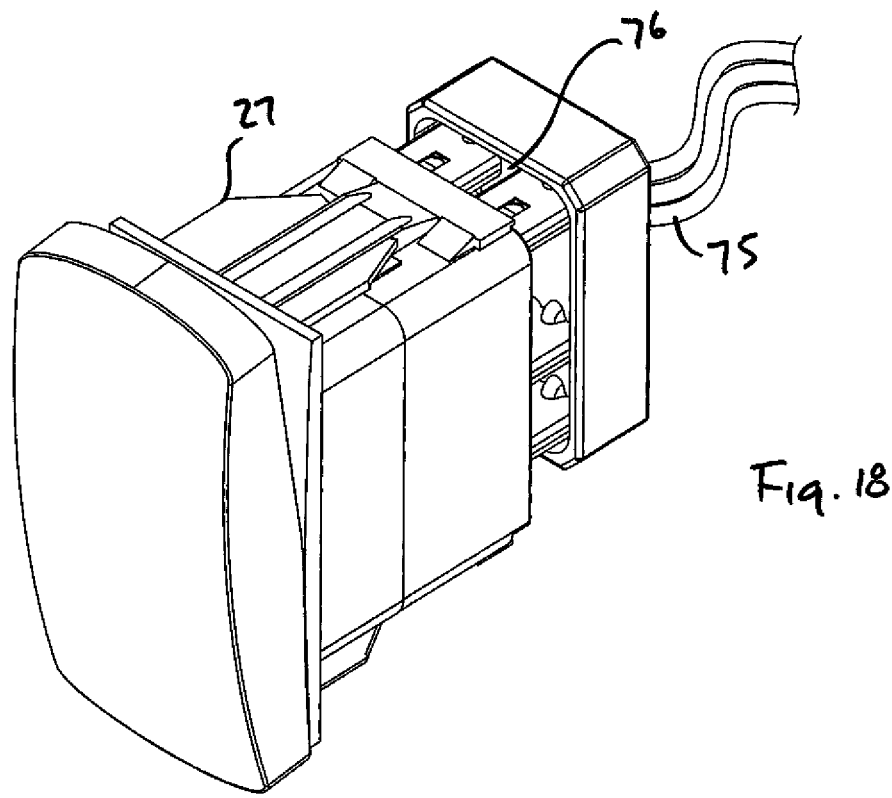
FIG. 18 is an enlarged perspective view of the switch and switch connector of FIG. 17 coupled together with the switch in the on position.

Switch wire harnesses 25 are configured to couple switches 27 to power distribution block 22 in FIG. 4. As shown in FIGS. 14 and 15, each switch wire harness 25 includes wires 70 having plug ends 72 coupled to a switch plug 73 and opposing switch ends 75 coupled to a switch connector 76. Switch plug 73 has a complemental format matching the format of switch socket 40 of power distribution block 22. Switch plug 73 is fixedly fastened to ends 72 in this embodiment. Switch connector 76 receives complemental connector 78 from switch 27, electrically coupling switch 27 to switch harness 25. In this embodiment, switch connector 76 includes five prong receiving members, and complemental connector 78 includes five prongs received by the five prong receiving members. This provides a secure physical and electrical connection between switch 27 and switch wire harness 25. Other formats are useful for switch connector 76 and complemental connector 78 in alternate embodiments according to the skill attributed to the skilled artisan. In this manner, various switches 27, having complemental connectors 78 with the same format as switch connector 76, can be used, easily replacing switches 27 if desired. FIG. 16 illustrates complemental connector 78 of switch 27 prepared to be inserted into switch connector 76 shown as it would appear configured with a protective shroud. FIG. 17 corresponds to FIG. 16 and illustrates complemental connector 78 of switch 27 inserted into switch connector 76, electrically coupling switch 27 to switch harness 25 with the switch 27 in an off position (opened switch) for deactivating its corresponding device. FIG. 18 illustrates switch connector 76 electrically coupling switch 27 to switch harness 25 with the switch 27 toggled to an on position (closed switch) for activating its corresponding device. Ends 75 can be hardwired to switch connector 76 allowing for quick and easy replacement of switch 27 in FIG. 18, or include ends 75 in FIG. 20 free to be wired to switch 27 as desired and shown in FIG. 20. Switch wire harnesses 25 having hardwired switch connector 76 require switches 27 have the same complemental connector format, while switch wire harnesses 25 having ends 75 free allow more flexibility with the selection of switches 27.

Device wire harnesses 24 are configured to couple devices 23 to power distribution block 22 in FIG. 4. When switch wire harnesses 25 couple switches 27 to power distribution block and device wire harnesses 24 couple devices 23 to power distribution block 22 in FIG. 4, switches 27 are operatively coupled to the respective devices 23, wherein each device 23 is deactivated when its corresponding switch 27 is off and activated when its corresponding switch 27 is on.

Figure 19:
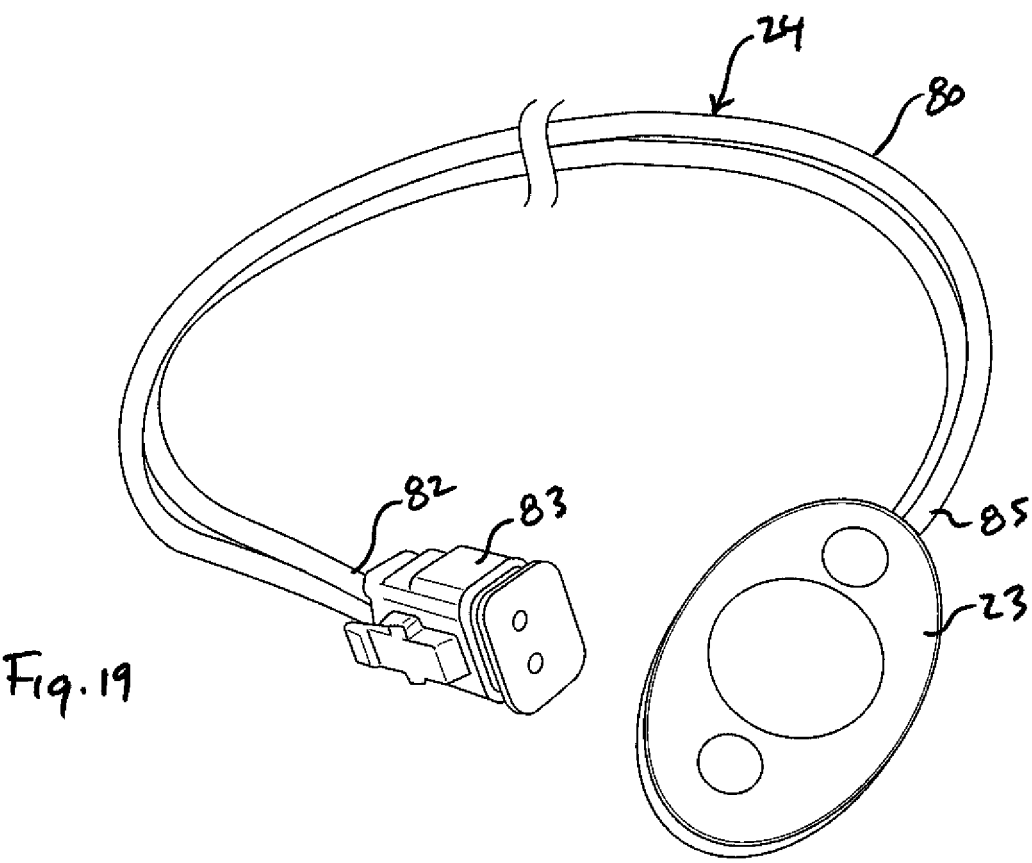
FIG. 19 is a perspective view of a device wire harness and attached device.

In FIG. 19, each device wire harness 24 includes wires 80 with plug ends 82 coupled to a device plug 83 and the opposing device ends 85 coupled to device 23. Device plug 83 has a complementary format that matches the format of device socket 42 of power distribution block 22 and specifically does not have the same format as switch plug 73. Device plug 83 is fastened fixedly to ends 82 in this embodiment. Ends 85 can be hardwired to device 23 as shown in FIG. 19, or include ends 85 free to be wired to devices 23 as desired and shown in FIG. 21. Device wire harnesses having hardwired devices 23 would be provided with the respective device 23, while device wire harnesses 24 having ends allow devices 23 to be provided separately and wired when needed, increasing flexibility and types of devices available.

Device wire harnesses 24 and switch wire harnesses 25 each electrically couple devices 23 and switches 27 to power distribution block 22 as can be seen with reference to FIGS. 4, 22, and 23. FIG. 22 illustrates system 20 with switch plug 73 of switch wiring harness 25 positioned to be inserted into a selected one of switch sockets 40 of the array of switch sockets 40 to electrically couple switch 27 to power distribution block 22. Device plug 83 of device wiring harness 24 is positioned to be inserted into one of device sockets 42 of the array of device sockets 42 associated with the selected switch socket 40 as a socket pair to electrically couple device 23 to power distribution block 22 and thereby electrically and operatively couple switch 27 to device 23 through the socket pair of power distribution block 22. FIG. 23 illustrates switch plug 73 and device plug 83 inserted in switch socket 40 and device socket 42 of a socket pair operatively coupling the switch 27 to its corresponding device 23, which activates when its corresponding switch 27 is on and deactivates when its corresponding switch 27 is off. As described previously, a specific device 23 to be controlled by a specific switch 27 are inserted into device socket 42 and switch socket 40 associated as a socket pair and electrically coupled by one of a relay 44 from the array of relays 44 to form a circuit coupled to the vehicle electric power source. In this embodiment, an additional five socket pairs with associated relays 44 and fuses 46 are provided. Each socket pair with associated switch wire harness 25 and associated device wire harness complete a circuit within power distribution block 22. One of ordinary skill in the art will understand that power distribution block 22 can incorporate more or less socket pairs as desired.

In FIG. 4, a switch wire harness 25 and a device wire harness 24 is coupled to each switch socket 40 and device socket 42 electrically coupling the opposing switch 27 and device 23 of each socket pair. When power is applied to input terminals 48 from the electrical power source of vehicle 10, each relay 44 of the array of relays 44 is automatically energized and closed to complete an electrical connection between device socket 42 and switch socket 40 of each socket pair. Relays 44 are in separate circuits from the device/switch circuits of each socket pair. Thus, one lead of the switch socket is connected to one lead of the device socket. Also, one lead or contact of each of the fuses is connected to the power and the other lead is connected to the second lead of the device socket. The other lead of the switch socket is connected to a power return (e.g. ground or a negative lead of the power source) to complete each device/switch circuit in a socket pair. Thus, when the device is plugged into the device socket and the switch is plugged into the switch socket of a socket pair, closing or turning the switch to the on position completes a circuit through power distribution block 22 for that socket pair and causes the device to operate. Fuses are on the hot side of the line of the socket pair so when a fuse blows the entire circuit is open.

Figure 24:
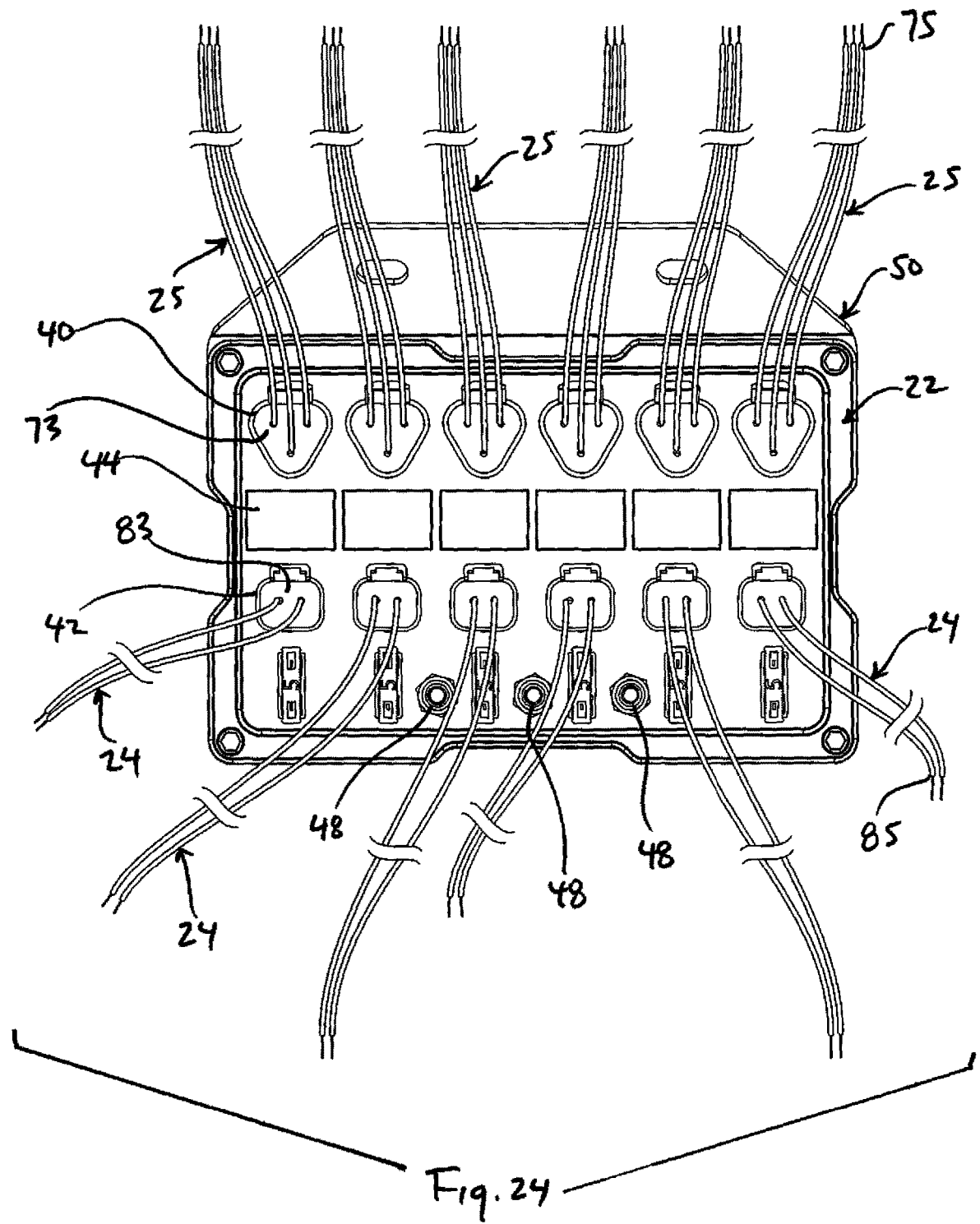
FIG. 24 is a top view of the modular power distribution system according to the present invention with free wire ends for attachment to devices.

FIG. 24 illustrates modular power distribution system 20 with switch wire harnesses 25 and device wire harnesses 24 attached to socket pairs of power distribution block 22 with ends 75 and 85 free and not yet attached to switches 27 or devices 23. In this exemplary embodiment, any selected switch or device can be attached to system 20.

Figure 25:
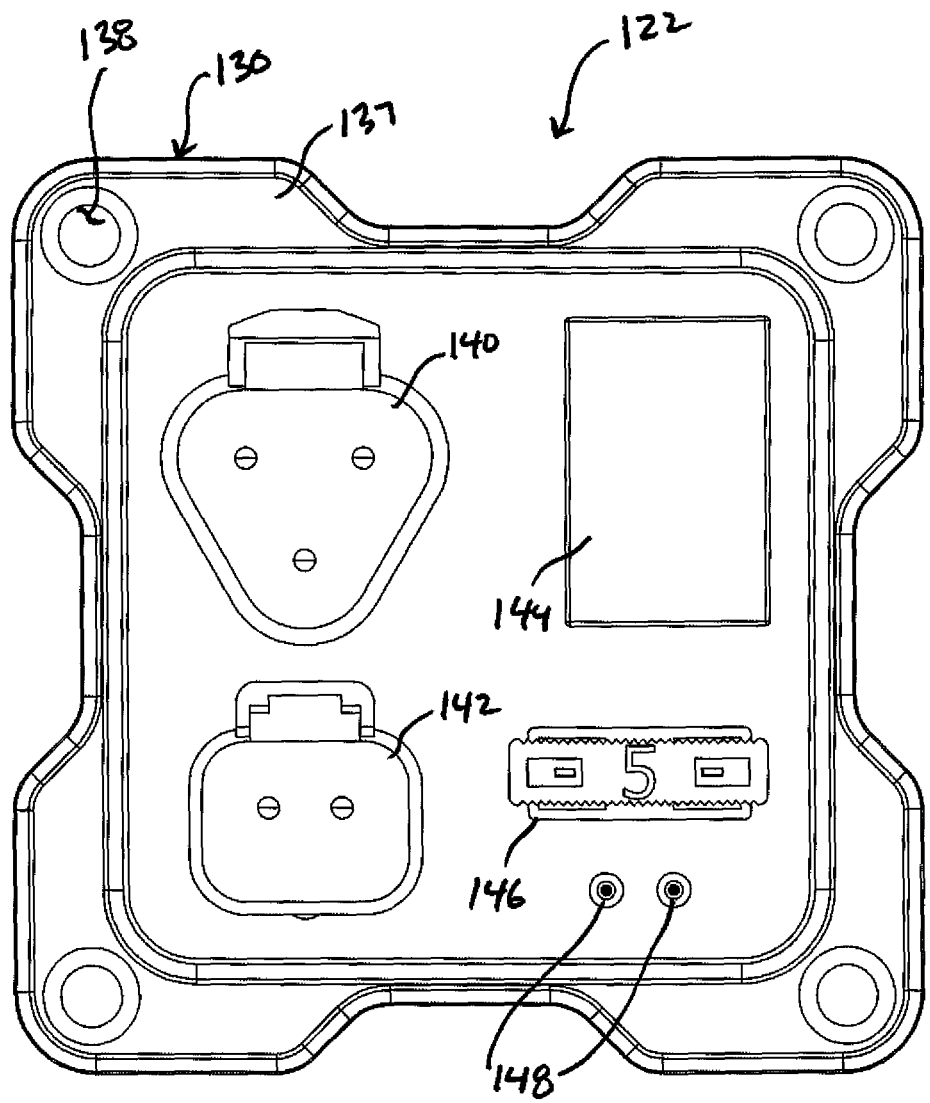
FIG. 25 is a top view of another embodiment of a power distribution block.
Figure 26:
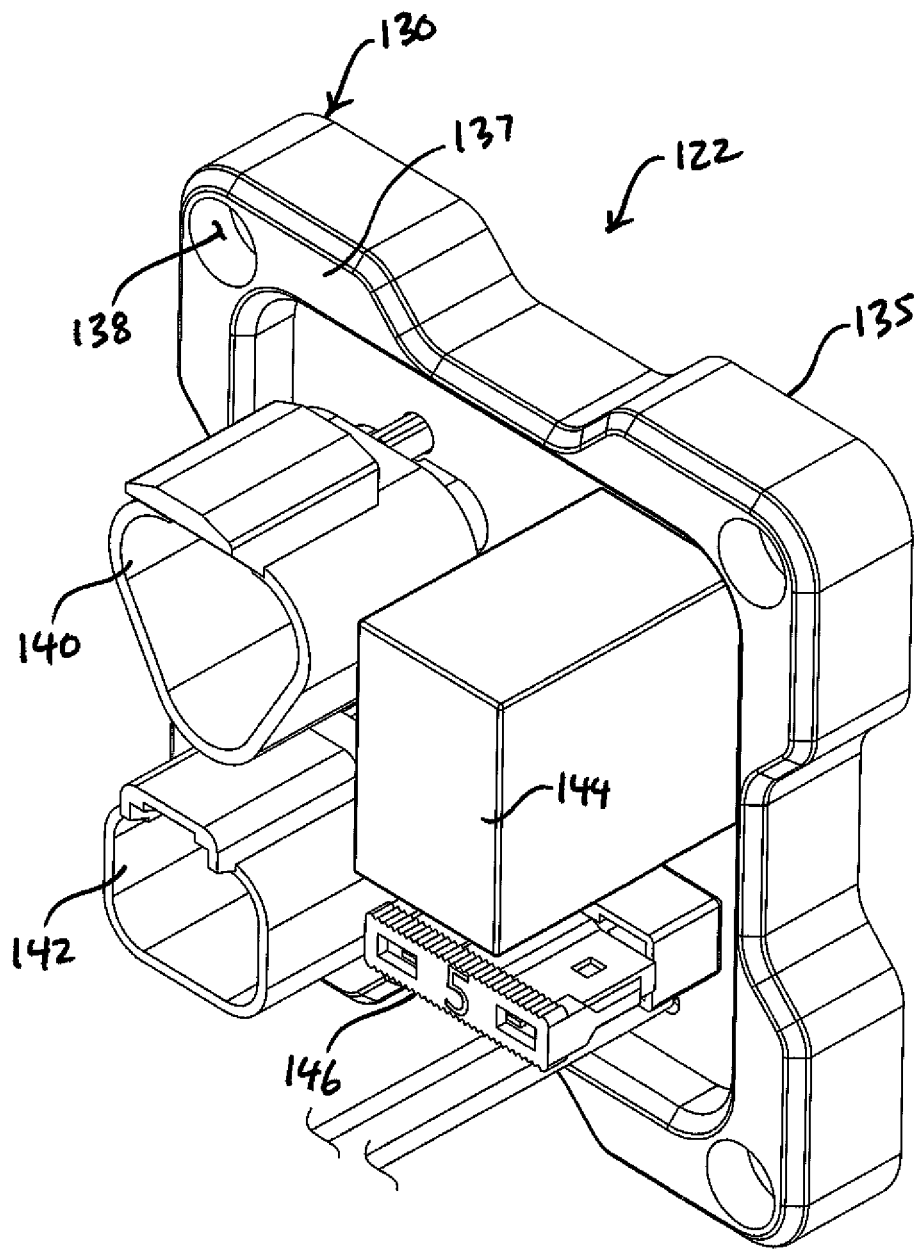
FIG. 26 is a perspective view of the power distribution block of FIG. 25.

FIGS. 25 and 26 illustrate another embodiment of a power distribution block 122 for use as a part of modular power distribution system 20. Power distribution block 122 is entirely self-contained and includes a base 130 having a front side 132, a back side 135, and a peripheral edge 137 with threaded apertures 138 formed through the corners thereof and extending from the front side 132 to back side 135. Power distribution block 122 includes a switch socket 140, a device socket 142, a relay 144, and a fuse 146. Switch socket 140, device socket 142, relay 144, and fuse extend from front side 132 of base 130. Switch socket 140 associates with device socket 142 forming a socket pair. The socket pair includes switch socket 140 and device socket 142 electrically coupled by relay 144. Fuse 146 operatively associates with the socket pair. In this embodiment of power distribution block 122, specific positioning of switch socket 140 and device socket 142 is not necessary to designate the socket pair since its designation is clear, with only two sockets being present. Relay 144 and fuse 146 are positioned adjacent to the socket pair. Power input terminals 148 are configured to receive electrical power from an electric power source and are in electric communication with the socket pair.

Power distribution block 122 in FIGS. 25 and 26 is configured to be mounted in a manner similar to power distribution block 22, including using a mounting plate 50 (not shown) fixed to power distribution block 122 with screws threaded concurrently through apertures 138 into apertures formed in mounting plate 50. A switch wire harness 25 and a device wire harness 24, as previously described, can be coupled to switch socket 140 and device socket 142, respectively, as designated by the format of the sockets to electrically couple switch 27 and device 23 to power distribution block 122. When power is applied to input terminals 148 from the electrical power source, relay 144 automatically energizes and closes to complete an electrical connection between device socket 142 and switch socket 140 of the socket pair. When switch 27 is closed (moved to the on position), the circuit is closed, providing electric power to device 23.

As illustrated in FIG. 27, in a particular embodiment, modular power distribution system 20 is enabled with a short-range wireless technology configured to wirelessly couple switches 27 (one switch 27 is shown in FIG. 27 for illustrative purposes) to the respective relays 44 enabling each device 23 to activate via its corresponding relay 44 when the corresponding switch 27 is on and generates an ON signal and deactivate via its corresponding relay 44 when the corresponding switch 27 is off and generates an OFF signal. Any suitable and readily available short-range wireless technology can be used. In this embodiment, each socket 40 receives a switch radio receiver unit 150. Switch radio receiver unit 150, when an ON signal is received from its corresponding switch 27, closes the circuit for the corresponding device 23 allowing electrical power to reach device 23 and "turn it on". Switch radio receiver unit 150, when an OFF signal is received from its corresponding switch 27, opens the circuit for the corresponding device 23 disabling electrical power from reaching device 23 and "turn it off". Switch radio receiver unit 150 will not be described in detail, as they are well known, and used in many applications such as wireless lights, socket adaptors and the like. Switch radio receiver unit 150 may be configured with a transceiver configured to receive signals from its corresponding switch and to send corresponding signals to a wireless receiver of a device for turning it on and off.

With additional reference to FIGS. 28-30, a wireless switch assembly, generally designated 170, is illustrated and acts as a control unit for the associated devices. Referring in relevant part to FIGS. 28-30, wireless switch assembly 170 includes a switch enclosure 172 carrying a circuit board 173 having switch sockets 174. Switch sockets 174 have a format, such as illustrated with multiple contacts. As discussed previously, any format can be employed. Switches 175, each having a switch plug 176, are received by switch enclosure 172 and each is attachable to a separate one of switch sockets 174. Switch plugs 176 have a complemental format matching the format of switch sockets 174 of circuit board 173. As with switch sockets 174, substantially any format can be employed, provided it is compatible with the format of switch sockets 174. Circuit board 173 carries a signal generator such as a wireless chip 178 for each of switch sockets 174. Thus, each of switches 175 is associated with one of wireless chips 178. Switch sockets 174 receive switch plugs 176 from switch 175, electrically coupling switch 175 to circuit board 173. When activated, each wireless chip sends a signal, such as a radio frequency signal, to an associated one of switch radio receiver unit 150.

A bracket 180 is attached to switch enclosure 172 by fasteners 182, such as screws and the like. A battery housing 185, having a plug 189, is attached to switch enclosure 172. Battery housing 185 carries batteries 187 which are electrically coupled to plug 189. A receptacle 190 is carried by switch enclosure 172 and is electrically coupled to circuit board 173. When battery housing 185 is fitted to switch enclosure 172, plug 189 is received by receptacle 190, powering circuit board 173. When one of switches 175 is moved from an off position to an on position, it activates the associated wireless chip, powered by batteries 187, to emit a signal. The signal is received by the associated switch radio receiver unit 150 and turns associated device 23 on or off as desired. One of ordinary skill in the art will understand that while wireless switch assembly 170 is used in this embodiment, other options can be used for a control unit such as smart phones and the like that have signal generators which can match a signal receiver.

Figure 31:
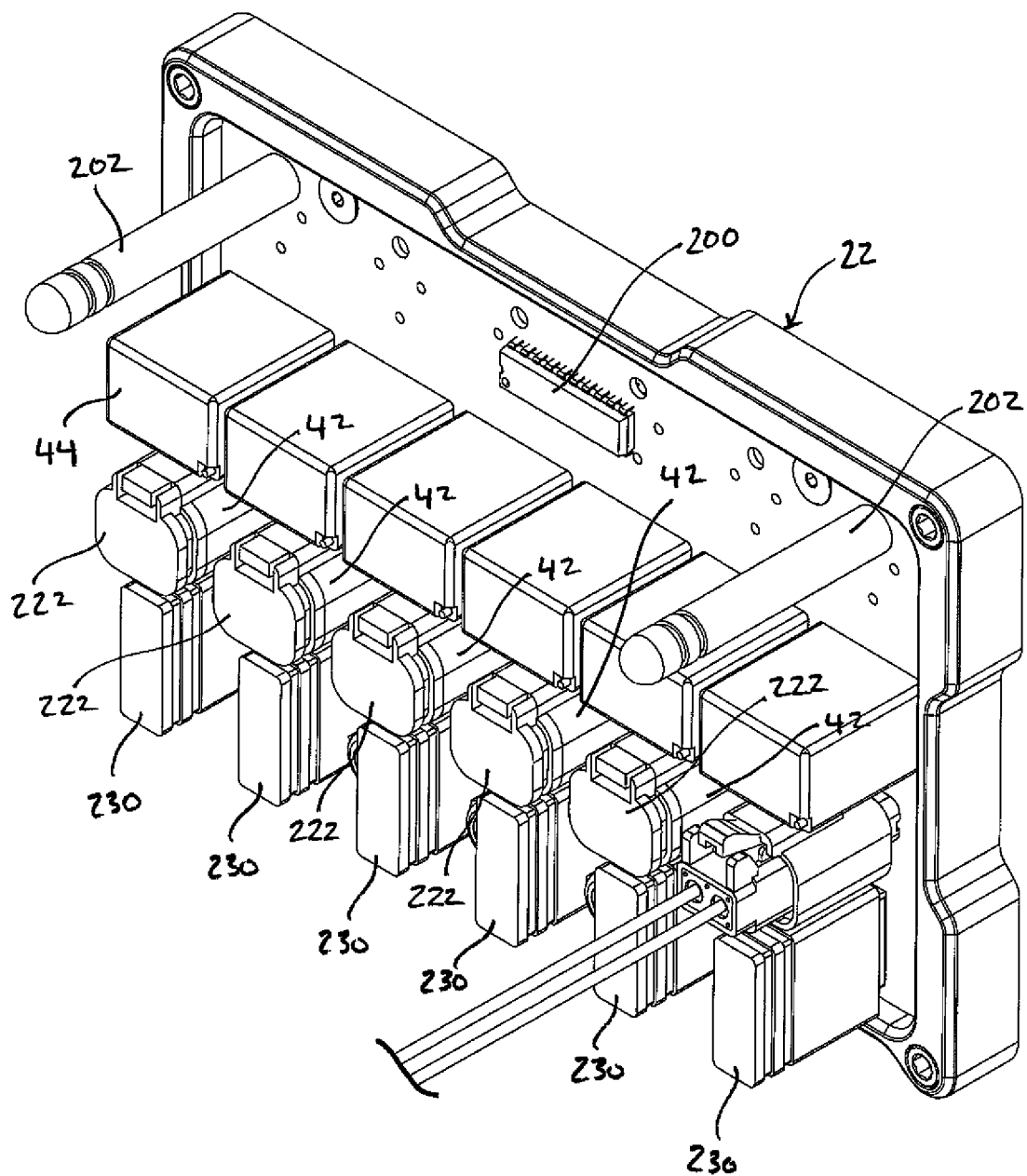
FIG. 31 is a perspective view of another embodiment of a power distribution block of a wireless switch embodiment of the modular power distribution system.

Referring in relevant part to FIG. 31, in another embodiment, modular power distribution system 20 is again enabled with a short-range wireless technology configured to wirelessly couple switches 175 from wireless switch assembly 170 to the respective relays 44 enabling each device 23 to activate via its corresponding relay 44 when the corresponding switch 175 is on and generates an ON signal and deactivate via its corresponding relay 44 when the corresponding switch 175 is off and generates an OFF signal. Any suitable and readily available short-range wireless technology can be used. In this embodiment, switch sockets 40 receiving switch radio receiver units 150 have been excluded from power distribution block 22 and replaced with a wireless receiver chip 200 electrically coupled to relays 44. Transponders 202 mounted on power distribution block 22 are coupled to wireless receiver chip 200 for signal transmission purposes. Wireless receiver chip 200 functions in a manner similar to switch radio receiver units 150 and can correspond to one or more relays 44. In the preferred embodiment, wireless receiver chip 200 includes multiple signal receivers each corresponding to a different one of relays 44 to actuate the associated device 23. Each signal receiver of wireless receiver chip 200, when an ON signal is received from a corresponding switch 175 of wireless switch assembly 170, closes the circuit for the corresponding device 23 allowing electrical power to reach device 23 and "turn it on". Each signal receiver of wireless receiver chip 200, when an OFF signal is received from a corresponding switch 175 of wireless switch assembly 170, opens the circuit for the corresponding device 23 disabling electrical power from reaching device 23 and "turn it off".

Figure 32:
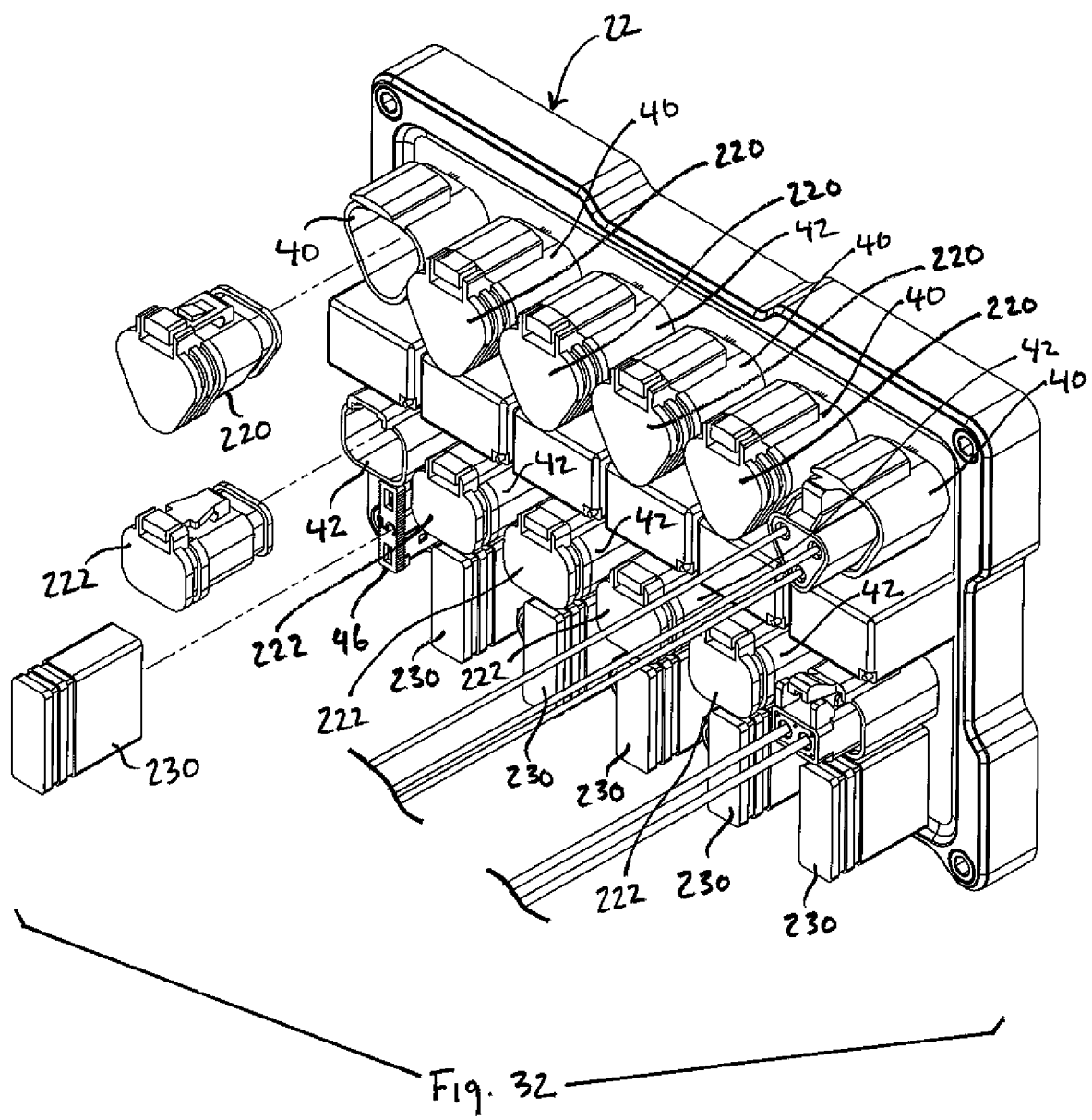
FIG. 32 is a perspective view of a power distribution block illustrating protective elements used thereon.
Figure 33:
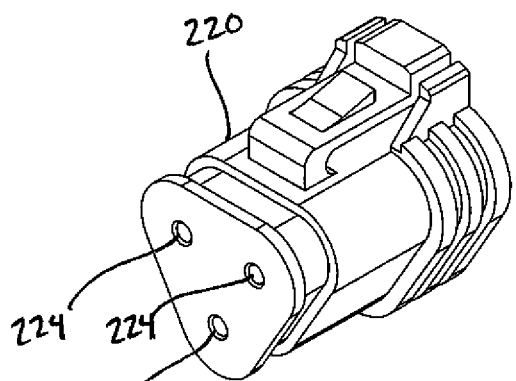
FIG. 33 is perspective view of a switch socket blank.

Protection of unused sockets of modular power distribution system 20 is desirable in many circumstances. Referring to FIG. 32, power distribution block 22 is illustrated with switch socket blanks 220 and device socket blanks 222 inserted in unused switch sockets 40 and device sockets 42, respectively. FIG. 31 illustrates power distribution block 22 with device socket blanks 222 inserted in unused device sockets 42. With additional reference to FIG. 33, switch socket blanks 220 are configured to be received within switch sockets 40. To this end, socket blanks 220 have an appropriate triangular shape and receptacles 224 for receiving the three-prong connector from switch sockets 40. Switch socket blanks 220 can be friction fit or latched in position, and are intended to prevent dirt and moisture from entering an un-used switch socket 40 and prevents damage and degradation thereof. One of ordinary skill in the art will understand that switch socket 40 can have a different format and that switch socket blanks 220 are configured with the appropriate format.

Figure 34:
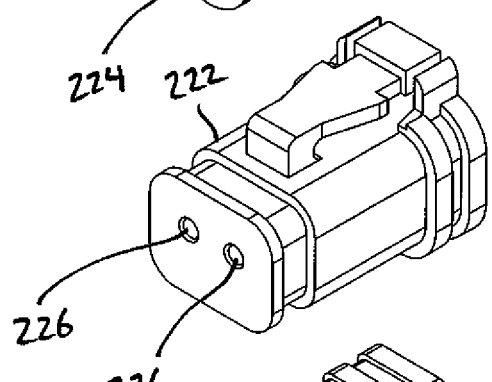
FIG. 34 is perspective view of a device socket blank.

Still referring to FIG. 32, with additional reference to FIG. 34, device socket blanks 222 are configured to be received within device sockets 42. To this end, device socket blanks 222 have an appropriate rectangular shape and receptacles 226 for receiving the two-prong connector from device sockets 42. Device socket blanks 222 can be friction fit or latched in position, and are intended to prevent dirt and moisture from entering an un-used device socket 42 and prevents damage and degradation thereof. One of ordinary skill in the art will understand that device socket 42 can have a different format and that device socket blanks 222 are configured with the appropriate format.

Figure 35:
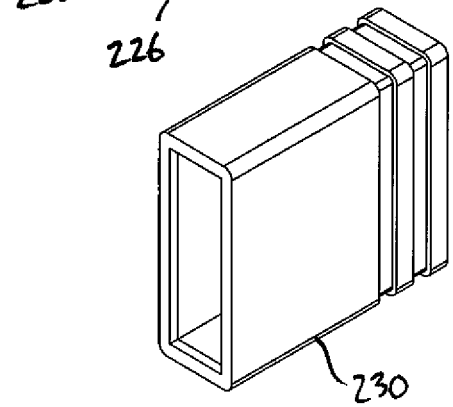
FIG. 35 is perspective view of a fuse cover.

Still referring to FIG. 32, with additional reference to FIG. 35, a fuse cover 230 is configured to be received over a fuse 46. Fuse cover 230 provides impact and wear protection for fuse 46. FIG. 32 shows covers 230 each received of a corresponding one of the remaining fuses. FIG. 31 shows covers 230 each received over a corresponding fuse.

The present invention is described above with reference to illustrative embodiments. Those skilled in the art will recognize that changes and modifications may be made in the described embodiments without departing from the nature and scope of the present invention. Various changes and modifications to the embodiments herein chosen for purposes of illustration will readily occur to those skilled in the art. To the extent that such modifications and variations do not depart from the spirit of the invention, they are intended to be included within the scope thereof.

The invention claimed is:

1. A modular power distribution system comprising:
   a power distribution block including a switch socket having a first format, a device socket having a second format different from the first format, the switch socket and the device socket forming a first designated socket pair, a first relay electrically coupling the switch socket to the device socket, the first relay, when powered, closes a circuit between the switch socket and the device socket, and input power terminals electrically coupled to the first designated socket pair and the first relay, and configured to be electrically coupled to an electric power source;

a switch wire harness including a wiring having a plug end and a switch end, a switch plug electrically coupled to the plug end, the switch plug having a first complemental format configured to be removably received by the first format of the switch socket; and a device wire harness including a wiring having a plug end and a device end, a device plug electrically coupled to the plug end, the device plug having a second complemental format configured to be removably received by the second format of the device socket.

2. The modular power distribution system as claimed in claim 1, further comprising:

a switch electrically coupled to the switch end of the switch wire harness; and a device electrically coupled to the device end of the device wire harness.

3. The modular power distribution system as claimed in claim 1, further comprising a fuse electrically coupled to the first designated socket pair.

4. The modular power distribution system as claimed in claim 2, wherein the switch end of the switch wire harness is coupled to a switch connector having a format, the switch having a complemental format removably receivable by the switch connector for electrically coupling the switch to the switch wire harness.

5. The modular power distribution system as claimed in claim 2, wherein the device end of the device wire harness is hardwired to the device.

6. The modular power distribution system as claimed in claim 1, wherein the power distribution block further includes a second switch socket having the first format, a second device socket having the second format, the second switch socket and the second device socket forming a second designated socket pair distinguishable from the first designated socket pair, a second relay electrically coupling the second switch socket to the second device socket, and the input power terminals electrically coupled to the second designated socket pair and the second relay.

7. The modular power distribution system as claimed in claim 6, wherein the first designated socket pair is distinguishable from the second designated socket pair by positioning the switch socket and the device socket of the first designated socket pair in opposition to one another and positioning the second switch socket and the second device socket of the second designated socket pair in opposition to one another.

8. A modular power distribution system installed in a vehicle, comprising:

a vehicle having an electric power source a power distribution block mounted to the vehicle, the power distribution block including a switch socket having a first format, a device socket having a second format different from the first format, the switch socket and the device socket forming a first designated socket pair, a first relay electrically coupling the switch socket to the device socket, and input power terminals electrically coupled to the first designated socket pair and the first relay, the input power terminals electrically connected to the electric power source, the input power terminals supplying power to the relay, thereby closing a circuit between the switch socket and the device socket;

a switch wire harness including a wiring having a plug end and a switch end, a switch plug electrically coupled to the plug end, the switch plug having a first complemental format removably received by the first format of the switch socket;

a device wire harness including a wiring having a plug end and a device end, a device plug electrically coupled to the plug end, the device plug having a second complemental format removably received by the second format of the device socket;

a switch electrically coupled to the switch end of the switch wire harness; and a device electrically coupled to the device end of the device wire harness;

wherein the relay is powered by the electric power source closing the circuit between the first designated socket pair, allowing the switch to operate the device.

9. The modular power distribution system as claimed in claim 8, further comprising a fuse electrically coupled to the first designated socket pair.

10. The modular power distribution system as claimed in claim 8, wherein the switch end of the switch wire harness is coupled to a switch connector having a format, the switch having a complemental format removably receivable by the switch connector for electrically coupling the switch to the switch wire harness.

11. The modular power distribution system as claimed in claim 8, wherein the device end of the device wire harness is hardwired to the device.

12. The modular power distribution system as claimed in claim 8, wherein the power distribution block further includes a second switch socket having the first format, a second device socket having the second format, the second switch socket and the second device socket forming a second designated socket pair distinguishable from the first designated socket pair, a second relay electrically coupling the second switch socket to the second device socket, and the input power terminals electrically coupled to the second designated socket pair and the second relay.

13. The modular power distribution system as claimed in claim 12, wherein the first designated socket pair is distinguishable from the second designated socket pair by positioning the switch socket and the device socket of the first designated socket pair in opposition to one another and positioning the second switch socket and the second device socket of the second designated socket pair in opposition to one another.

14. A method of installing electrically operated devices on a vehicle:

providing a vehicle with an electric power source;

providing a power distribution block including a switch socket having a first format, a device socket having a second format different from the first format, the switch socket and the device socket forming a first designated socket pair, a first relay electrically coupling the switch socket to the device socket, and input power terminals electrically coupled to the first designated socket pair and the first relay;

mounting the power distribution block to the vehicle;

connecting the electric power source to the input power terminals of the power distribution block, the relay automatically closing upon being powered by the electric power source, closing a circuit between the switch socket and the device socket;

providing a first switch wire harness including a wiring having a plug end and a switch end, a switch plug electrically coupled to the plug end, the switch plug having a first complemental format configured to be removably received by the first format of the switch socket;

inserting the switch plug into the switch socket;

providing a first device wire harness including a wiring having a plug end and a device end, a device plug electrically coupled to the plug end, the device plug having a second complemental format configured to be removably received by the second format of the device socket;

inserting the device plug into the device socket;

coupling a switch to the switch end;

coupling a device to the device end; and operating the device using the switch.

15. The method as claimed in claim 14, wherein the step of coupling the switch to the switch end includes:

providing the switch end of the first switch wire harness with a switch connector having a format;

providing the switch with a complemental format; and coupling the switch to the switch connector with the complemental format of the switch received by the format of the switch connector.

16. The method as claimed in claim 14, wherein the step of coupling the device to the device end includes the step of hardwiring the device end of the first device wire harness to the device.

17. The method as claimed in claim 14, wherein the step of providing the power distribution block further comprises the steps of:

providing the power distribution block with a second switch socket having the first format, a second device socket having the second format, the second switch socket and the second device socket forming a second designated socket pair, a second relay electrically coupling the second switch socket to the second device socket, and the input power terminals electrically coupled to the second designated socket pair and the second relay; and distinguishing the second designated socket pair from the first designated socket pair.

18. The method as claimed in claim 17, wherein the step of distinguishing the second designated socket pair from the first designated socket pair comprises the steps of:

positioning the switch socket and the device socket of the first designated socket pair in opposition to one another; and positioning the second switch socket and the second device socket of the second designated socket pair in opposition to one another.

19. The method as claimed in claim 18, further comprising the steps of:

providing a second switch wire harness including a wiring having a plug end and a switch end, a switch plug electrically coupled to the plug end, the switch plug having a first complemental format configured to be removably received by the first format of the second switch socket;

inserting the switch plug of the second switch wire harness into the second switch socket;

providing a second device wire harness including a wiring having a plug end and a device end, a device plug electrically coupled to the plug end, the device plug having a second complemental format configured to be removably received by the second format of the second device socket; and inserting the device plug of the second device wire harness into the second device socket.

* * * * *